United States Patent
Kato et al.

(10) Patent No.: US 6,494,557 B1
(45) Date of Patent: Dec. 17, 2002

(54) TEST PATTERN PRINTING METHOD, INFORMATION PROCESSING APPARATUS AND PRINTING APPARATUS

(75) Inventors: Masao Kato, Kawasaki (JP); Kentaro Yano, Yokohama (JP); Daigoro Kanematsu, Kawasaki (JP); Minako Kato, Yokohama (JP); Mitsuhiro Ono, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/551,769

(22) Filed: Apr. 18, 2000

(30) Foreign Application Priority Data

Apr. 19, 1999 (JP) .......................................... 11-111498

(51) Int. Cl.⁷ ................................................ B41J 2/01
(52) U.S. Cl. ......................................... 347/19; 358/504
(58) Field of Search .............................. 347/15, 19, 43; 358/504

(56) References Cited

U.S. PATENT DOCUMENTS

| | | | |
|---|---|---|---|
| 5,416,613 A | 5/1995 | Rolleston et al. ............ | 358/518 |
| 5,469,267 A | 11/1995 | Wang ......................... | 358/3.21 |
| 5,649,073 A | 7/1997 | Knox et al. .................. | 358/1.9 |
| 5,748,330 A | 5/1998 | Wang et al. ................. | 358/3.21 |
| 5,898,443 A | * 4/1999 | Yoshino et al. ............... | 347/19 |
| 6,027,200 A | * 2/2000 | Takahashi et al. ........... | 347/196 |
| 6,069,973 A | * 5/2000 | Lin et al. ..................... | 382/167 |
| 6,076,915 A | * 6/2000 | Gast et al. ..................... | 347/19 |
| 6,126,264 A | * 10/2000 | Suzuki et al. .................. | 347/19 |

FOREIGN PATENT DOCUMENTS

JP  2661917  6/1997

OTHER PUBLICATIONS

U.S. patent application Ser. No. 09/549,719, filed Apr. 14, 2000, pending.
U.S. patent application Ser. No. 09/551,768, filed Apr. 18, 2000, pending.
U.S. patent application Ser. No. 09/551,875, filed Apr. 18, 2000, pending.
U.S. patent application Ser. No. 09/551,671, filed Apr. 18, 2000, pending.

* cited by examiner

Primary Examiner—Craig Hallacher
(74) Attorney, Agent, or Firm—Fitzpatrick, Cella, Harper & Scinto

(57) ABSTRACT

In the process of correcting a color deviation caused by output characteristic variations among different colorants in a printing apparatus, a method of printing a test pattern allows an appropriate and highly accurate visual detection of the color deviation. More specifically, the test pattern has a plurality of patches printed therein, each of which has placed adjacent to each other a test area to be checked for the color deviation and a reference area serving as a criterion for color deviation and which has the test area and the reference area repeated alternately. If the colors of the two areas look different during the comparison of only one pair of the test area and the reference area, the pattern of the two alternately repeated areas makes the colors of the two areas appear more uniform, alleviates a high color difference sensitivity and thereby enables easy identification of a patch that matches the accuracy of the correction performed according to the color deviation detection.

28 Claims, 19 Drawing Sheets

FIG. 1

C INCREASES →

M INCREASES ↓

| | C1 | C2 | C3 | C4 | C5 |
|---|---|---|---|---|---|
| Row 1 | C:96 M:96 Y:128 K:0 / C:0 M:0 Y:0 K:128 | C:112 M:96 Y:128 K:0 / C:0 M:0 Y:0 K:128 | C:128 M:96 Y:128 K:0 / C:0 M:0 Y:0 K:128 | C:144 M:96 Y:128 K:0 / C:0 M:0 Y:0 K:128 | C:160 M:96 Y:128 K:0 / C:0 M:0 Y:0 K:128 |
| Row 2 | 96,112,128,0 / 0,0,0,128 | 112,112,128,0 / 0,0,0,128 | 128,112,128,0 / 0,0,0,128 | 144,112,128,0 / 0,0,0,128 | 160,112,128,0 / 0,0,0,128 |
| Row 3 | 96,128,128,0 / 0,0,0,128 | 112,128,128,0 / 0,0,0,128 | 128,128,128,0 / 0,0,0,128 | 144,128,128,0 / 0,0,0,128 | 160,128,128,0 / 0,0,0,128 |
| Row 4 | 96,144,128,0 / 0,0,0,128 | 112,144,128,0 / 0,0,0,128 | 128,144,128,0 / 0,0,0,128 | 144,144,128,0 / 0,0,0,128 | 160,144,128,0 / 0,0,0,128 |
| Row 5 | 96,160,128,0 / 0,0,0,128 | 112,160,128,0 / 0,0,0,128 | 128,160,128,0 / 0,0,0,128 | 144,160,128,0 / 0,0,0,128 | 160,160,128,0 / 0,0,0,128 |

| | C GRADATION VALUE | M GRADATION VALUE |
|---|---|---|
| | Y GRADATION VALUE | K GRADATION VALUE |

C INCREASES →

M INCREASES ↓

|   | A | 96  96 / 128  0 | 112  96 / 128  0 | 128  96 / 128  0 | 144  96 / 128  0 | 160  96 / 128  0 |
|---|---|---|---|---|---|---|
|   | B | 0  0 / 0  128 | 0  0 / 0  128 | 0  0 / 0  128 | 0  0 / 0  128 | 0  0 / 0  128 |
|   | A | 96  96 / 128  0 | 112  96 / 128  0 | 128  96 / 128  0 | 114  96 / 128  0 | 160  96 / 128  0 |
|   | B | 0  0 / 0  128 | 0  0 / 0  128 | 0  0 / 0  128 | 0  0 / 0  128 | 0  0 / 0  128 |

| 96  112 / 128  0 | 112  112 / 128  0 | 128  112 / 128  0 | 144  12 / 128  0 | 160  112 / 128  0 |
|---|---|---|---|---|
| 0  0 / 0  128 | 0  0 / 0  128 | 0  0 / 0  128 | 0  0 / 0  128 | 0  0 / 0  128 |
| 96  112 / 128  0 | 112  112 / 128  0 | 128  112 / 128  0 | 114  112 / 128  0 | 160  112 / 128  0 |
| 0  0 / 0  128 | 0  0 / 0  128 | 0  0 / 0  128 ~Ps | 0  0 / 0  128 | 0  0 / 0  128 |

| 96  128 / 128  0 | 112  128 / 128  0 | 128  128 / 128  0 | 144  128 / 128  0 | 160  128 / 128  0 |
|---|---|---|---|---|
| 0  0 / 0  128 | 0  0 / 0  128 | 0  0 / 0  128 | 0  0 / 0  128 | 0  0 / 0  128 |
| 96  128 / 128  0 | 112  128 / 128  0 | 128  128 / 128  0 | 114  128 / 128  0 | 160  128 / 128  0 |
| 0  0 / 0  128 | 0  0 / 0  128 | 0  0 / 0  128 | 0  0 / 0  128 | 0  0 / 0  128 |

| 96  144 / 128  0 | 112  144 / 128  0 | 128  144 / 128  0 | 144  144 / 128  0 | 160  144 / 128  0 |
|---|---|---|---|---|
| 0  0 / 0  128 | 0  0 / 0  128 | 0  0 / 0  128 | 0  0 / 0  128 | 0  0 / 0  128 |
| 96  144 / 128  0 | 112  144 / 128  0 | 128  144 / 128  0 | 114  144 / 128  0 | 160  144 / 128  0 |
| 0  0 / 0  128 | 0  0 / 0  128 | 0  0 / 0  128 | 0  0 / 0  128 | 0  0 / 0  128 |

| 96  160 / 128  0 | 112  160 / 128  0 | 128  160 / 128  0 | 144  160 / 128  0 | 160  160 / 128  0 |
|---|---|---|---|---|
| 0  0 / 0  128 | 0  0 / 0  128 | 0  0 / 0  128 | 0  0 / 0  128 | 0  0 / 0  128 |
| 96  160 / 128  0 | 112  160 / 128  0 | 128  160 / 128  0 | 114  160 / 128  0 | 160  160 / 128  0 |
| 0  0 / 0  128 | 0  0 / 0  128 | 0  0 / 0  128 | 0  0 / 0  128 | 0  0 / 0  128 |

FIG. 7

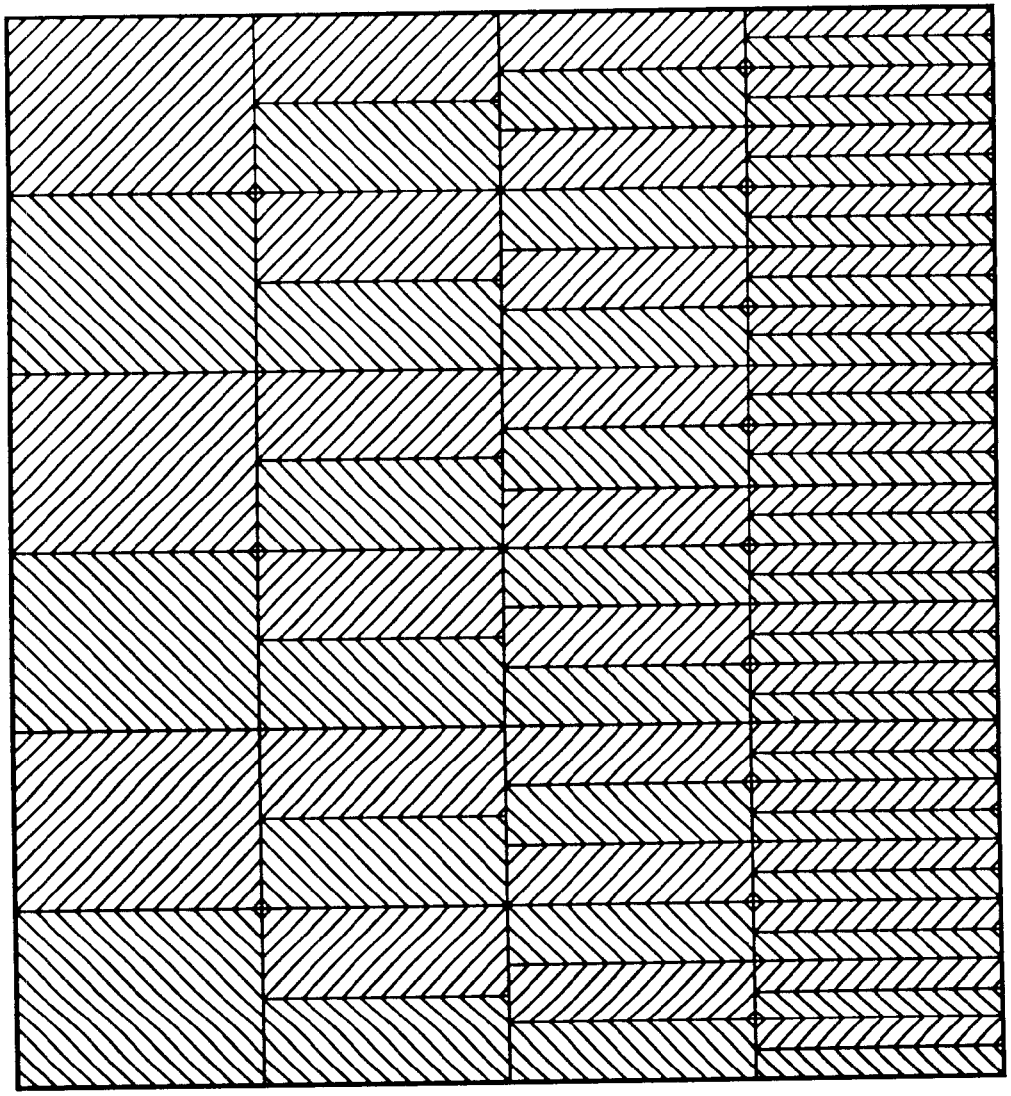
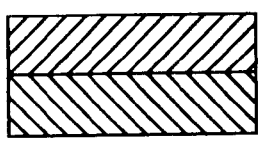 AREA OF COLOR A
AREA OF COLOR B
FIG.10

|  | C GRADATION VALUE | M GRADATION VALUE |
|---|---|---|
|  | Y GRADATION VALUE | K GRADATION VALUE |

C INCREASES →

M INCREASES ↓

| 96 96<br>128 0<br>48 48<br>64 64<br>96 98<br>128 0<br>48 48<br>64 64 | 112 96<br>128 0<br>56 48<br>64 64<br>112 98<br>128 0<br>56 48<br>64 64 | 128 96<br>128 0<br>64 48<br>64 64<br>128 98<br>128 0<br>64 48<br>64 64 | 144 96<br>128 0<br>72 48<br>64 64<br>144 98<br>128 0<br>72 48<br>64 64 | 160 96<br>128 0<br>80 48<br>64 64<br>160 98<br>128 0<br>80 48<br>64 64 |
|---|---|---|---|---|
| 96 112<br>128 0<br>48 56<br>64 64<br>96 112<br>128 0<br>48 56<br>64 64 | 112 112<br>128 0<br>56 56<br>64 64<br>112 112<br>128 0<br>56 56<br>64 64 | 128 112<br>128 0<br>64 56<br>64 64<br>128 112<br>128 0<br>64 56<br>64 64 | 144 112<br>128 0<br>72 56<br>64 64<br>144 112<br>128 0<br>72 56<br>64 64 | 160 112<br>128 0<br>80 56<br>64 64<br>160 112<br>128 0<br>80 56<br>64 64 |
| 96 128<br>128 0<br>48 64<br>64 64<br>96 128<br>128 0<br>48 64<br>64 64 | 112 128<br>128 0<br>56 64<br>64 64<br>112 128<br>128 0<br>56 64<br>64 64 | 128 128<br>128 0<br>64 64<br>64 64<br>128 128<br>128 0<br>64 64<br>64 64 | 144 128<br>128 0<br>72 64<br>64 64<br>144 128<br>128 0<br>72 64<br>64 64 | 160 128<br>128 0<br>80 64<br>64 64<br>160 128<br>128 0<br>80 64<br>64 64 |
| 96 144<br>128 0<br>48 72<br>64 64<br>96 144<br>128 0<br>48 72<br>64 64 | 112 144<br>128 0<br>56 72<br>64 64<br>112 144<br>128 0<br>56 72<br>64 64 | 128 144<br>128 0<br>64 72<br>64 64<br>128 144<br>128 0<br>64 72<br>64 64 | 144 144<br>128 0<br>72 72<br>64 64<br>144 144<br>128 0<br>72 72<br>64 64 | 160 144<br>128 0<br>80 72<br>64 64<br>160 144<br>128 0<br>80 72<br>64 64 |
| 96 160<br>128 0<br>48 80<br>64 64<br>96 160<br>128 0<br>48 80<br>64 64 | 112 160<br>128 0<br>56 80<br>64 64<br>112 160<br>128 0<br>56 80<br>64 64 | 128 160<br>128 0<br>64 80<br>64 64<br>128 160<br>128 0<br>64 80<br>64 64 | 144 160<br>128 0<br>72 80<br>64 64<br>144 160<br>128 0<br>72 80<br>64 64 | 160 160<br>128 0<br>80 80<br>64 64<br>160 160<br>128 0<br>80 80<br>64 64 |

FIG. 11

| C GRADATION VALUE | M GRADATION VALUE |
|---|---|
| Y GRADATION VALUE | K GRADATION VALUE |

M INCREASES →      C-M TEST PATTERN

| 128 | 144 | | 128 | 160 | | 128 | 176 | | 128 | 192 | | 128 | 208 |
|---|---|---|---|---|---|---|---|---|---|---|---|---|---|
| 128 | 0 | | 128 | 0 | | 128 | 0 | | 128 | 0 | | 128 | 0 |
| 160 | 128 | | 160 | 128 | | 160 | 128 | | 160 | 128 | | 160 | 128 |
| 128 | 64 | | 128 | 64 | | 128 | 64 | | 128 | 64 | | 128 | 64 |
| 128 | 144 | | 128 | 160 | | 128 | 176 | | 128 | 192 | | 128 | 208 |
| 128 | 0 | | 128 | 0 | | 128 | 0 | | 128 | 0 | | 128 | 0 |
| 160 | 128 | | 160 | 128 | | 160 | 128 | | 160 | 128 | | 160 | 128 |
| 128 | 64 | | 128 | 64 | | 128 | 64 | | 128 | 64 | | 128 | 64 |
| 128 | 144 | | 128 | 160 | | 128 | 176 | | 128 | 192 | | 128 | 208 |
| 128 | 0 | | 128 | 0 | | 128 | 0 | | 128 | 0 | | 128 | 0 |
| 160 | 128 | | 160 | 128 | | 160 | 128 | | 160 | 128 | | 160 | 128 |
| 128 | 64 | | 128 | 64 | | 128 | 64 | | 128 | 64 | | 128 | 64 |
| 128 | 144 | | 128 | 160 | | 128 | 176 | | 128 | 192 | | 128 | 208 |
| 128 | 0 | | 128 | 0 | | 128 | 0 | | 128 | 0 | | 128 | 0 |
| 160 | 128 | | 160 | 128 | | 160 | 128 | | 160 | 128 | | 160 | 128 |
| 128 | 64 | | 128 | 64 | | 128 | 64 | | 128 | 64 | | 128 | 64 |

Y INCREASES →      C-Y TEST PATTERN

| 128 | 128 | | 128 | 128 | | 128 | 128 | | 128 | 128 | | 128 | 128 |
|---|---|---|---|---|---|---|---|---|---|---|---|---|---|
| 144 | 0 | | 160 | 0 | | 176 | 0 | | 192 | 0 | | 208 | 0 |
| 160 | 128 | | 160 | 128 | | 160 | 128 | | 160 | 128 | | 160 | 128 |
| 128 | 64 | | 128 | 64 | | 128 | 64 | | 128 | 64 | | 128 | 64 |
| 128 | 128 | | 128 | 128 | | 128 | 128 | | 128 | 128 | | 128 | 128 |
| 144 | 0 | | 160 | 0 | | 176 | 0 | | 192 | 0 | | 208 | 0 |
| 160 | 128 | | 160 | 128 | | 160 | 128 | | 160 | 128 | | 160 | 128 |
| 128 | 64 | | 128 | 64 | | 128 | 64 | | 128 | 64 | | 128 | 64 |
| 128 | 128 | | 128 | 128 | | 128 | 128 | | 128 | 128 | | 128 | 128 |
| 144 | 0 | | 160 | 0 | | 176 | 0 | | 192 | 0 | | 208 | 0 |
| 160 | 128 | | 160 | 128 | | 160 | 128 | | 160 | 128 | | 160 | 128 |
| 128 | 64 | | 128 | 64 | | 128 | 64 | | 128 | 64 | | 128 | 64 |
| 128 | 128 | | 128 | 128 | | 128 | 128 | | 128 | 128 | | 128 | 128 |
| 144 | 0 | | 160 | 0 | | 176 | 0 | | 192 | 0 | | 208 | 0 |
| 160 | 128 | | 160 | 128 | | 160 | 128 | | 160 | 128 | | 160 | 128 |
| 128 | 64 | | 128 | 64 | | 128 | 64 | | 128 | 64 | | 128 | 64 |

FIG.12

TEST PATTERN PRINTING METHOD, INFORMATION PROCESSING APPARATUS AND PRINTING APPARATUS

BACKGROUND OF THE INVENTION

1. Field of the Invention

This application is based on Japanese Patent Application No. 11-111498 (1999) filed Apr. 19, 1999, the content of which is incorporated hereinto by reference.

The present invention relates to a test pattern printing method, an information processing apparatus and a printing apparatus, and more specifically to a test pattern printing method to print a test pattern which is checked for detecting a color deviation, the deviation being caused by variations in an output characteristic among print heads, and an information processing apparatus and a printing apparatus to perform printing of the test pattern.

2. Description of the Related Art

As devices for automated office work have come into wide use, an opportunity of producing color images in an office has increased. Output devices for outputting color images is known as a printing apparatus of various methods, such as an ink jet method, an electro-photographic method and a heat transfer method. These printing apparatuses have become able to output picture-like color images of relatively high quality in recent years.

Such printing apparatus generally prints color images using three colorants of chromatic colors, cyan(C), magenta (M) and yellow(Y), or four colorants with an additional achromatic color, black(K). The printed color image, however, may have a color deviation or color misrepresentation (e.g., produced color in the printed image differs from a desired one) due to an imbalance of output characteristics (reflection density or lightness, saturation, hue, etc.) among print heads for respective colors. In the ink jet system, for example, the print heads may have, among themselves, differences in an amount of heat produced by heaters (film thickness of the heater) for ejecting ink and differences in a size and shape of ink ejection orifices, causing differences in an amount of ejected ink. This in turn may result in the output characteristic imbalance among the print heads for individual color, as described above. Not only do the print heads inherently having such differences, but it is also known that these differences are produced with elapse of time.

To cope with this problem, a personal computer functioning as a host computer for the printing apparatus, or the printing apparatus itself, may perform correction processing which involves detecting the color deviation due to the differences among respective print heads and, based on the result of detection, correcting the output characteristics of the print heads to have predetermined characteristics. The correction processing is generally known to be carried out in two ways, which are distinguished depending primarily on whether the detection of the color deviation is done by using an input device such as scanner or by a human visual check. An outline of these two correction methods, as distinguished by the way of detecting the color deviation, will be briefly explained below.

The method using an input device such as a scanner, for example, first prints a patch pattern by using the print heads of C, M, Y and K coloring materials that are subjects of the correction, as disclosed in the official gazette of Japanese Patent No. 2661917. Then, the patch pattern is read by means of the scanner to detect a difference between a read value (representing an output characteristic of the head) and an expected value calculated from the print data for the patch pattern. Based on the detected difference, the color deviation is corrected. The patch pattern used in this method may be a solid pattern of each of C, M, Y, K colors or a patch pattern of each color having patches showing a gradation in density. The gradation patch pattern can also be used to detect an output characteristic with respect to a halftone, thus improving precision of detecting the color deviation. A method is also known as that combines the C, M, Y and K to form second- or third-color patch patterns and thereby improves the detection and correction accuracy.

On the other hand, the method using the visual check, unlike the method using the input device, can not easily detect an absolute value with respect to the output characteristic for each color head. Hence, a detection method that uses a third-color patch pattern printed by mixing three colorants C, M, Y is mostly used. More specifically, a plurality of patches of almost gray color is printed. The plurality of patches includes a patch as a central patch of the plurality of patches, which is expected to be printed at a predetermined ratio of three colorants (represented by print data of three colorants) so as to be a patch of an achromatic color when the patch is printed by using print heads with an average ink ejection amount or without any deviation of ink ejection amount, and other patches which are printed with their three-color ratios successively changed slightly. From the plurality of patches a user visually chooses one patch closest to the achromatic color so as to detect the patch of the most appropriate output characteristic balance among the C, M, Y color print heads. Then, the correction data corresponding to the detected patch is used to correct the output characteristic of each print head. This method of detecting the color deviation takes advantage of the fact that a slight imbalance in the output characteristic among the C, M, Y color print heads causes the color having a relatively large output characteristic change to appear in the patch, resulting in the patch deviating from the achromatic color.

While the color deviation and the method of its detection have been described for the case of the print heads of ink jet system, differences in the output characteristics of the color print heads may also occur with the printing apparatus of electrophotographic system and heat transfer system due to causes peculiar to the operation principles of the respective printing systems. In these printing systems, also, the color deviation detection and correction are performed in a similar manner.

The conventional color deviation detection method described above, however, has the following drawbacks.

First, in a usual environment in which the printing apparatus is used, the method using an input device such as scanner requires a condition that the user owns the input device. Not all users have the input device available and thus the method using the scanner or other input devices is not realistic. If some input device is made available, the correction process on a basis of the color deviation detection using such wide variation of input devices is often very difficult to be carried out.

The method based on visual check, on the other hand, does not require any special input device and thus can be employed by any user to detect the color deviation. It is however not so easy to select a patch closest to achromatic color from a plurality of patches with their C, M, Y color ratios progressively changed slightly.

For example, JIS (JIS E3305, JIS Z8721, JIS L0600, etc.) and various other organizations provide specifications concerning a color difference (AE). In these specifications, a range of the color difference of 3.2–6.5 is defined as a "range that can be handled as the same color in terms of impression." This suggests that visually picking up a patch closest to achromatic color from patches in this range of color difference is difficult. It is also stated that the color difference in such a range may "cause a customer to complain about difference in color when selecting paint color," suggesting that even in this range of color difference, if a wrong patch is selected, an image printed after being corrected by a correction value corresponding to the selected patch may fail to provide a desired color.

For this reason, an effort is being made to improve the accuracy of the visual check-based color deviation detection method.

FIG. 1 is a view schematically showing an example of test pattern that enables an improvement of precision for detecting the color deviation. In FIG. 1, each frame represents a patch printed with a mixture of C, M and Y colors and with K. Four numbers in each of two areas in each patch represent multi-valued gradation data for printing the associated area and correspond, from top to bottom, to C, M, Y and K. Thus, the patch shown in FIG. 1 consists of two upper and lower areas. Then, a test pattern is made up of an array of such patches with their gradation value of M increasing vertically downward in five steps and that of C increasing horizontally toward right in five steps.

As apparent from FIG. 1, a test area defined by the upper area in each patch is an area printed with a mixture of C, M, Y colorants of chromatic colors (the mixed color is hereinafter referred to as "PCBk" that is "process black"). A reference area defined by the lower area is an area printed with only K, a colorant of achromatic color. In the upper area printed with PCBk the gradation value of Y is fixed at a 128 level. Further, as described above, value of C in the pattern increases toward the right and value of M increases downwardly.

With the test pattern constructed in this way, the precision of visual detection can be improved. More specifically, this pattern takes advantage of a visual characteristic that when objects are close together, a small color difference can be perceived. More concretely, this pattern is based on a fact that even if the color difference is as small as 0.8–1.6, comparison between adjacent objects allows a human eye to perceive the color difference. The pattern of this method allows the user, rather than to search, without any criterion, through a plurality of patches printed with only PCBk to find a patch closest to achromatic color, to make one-tone comparison between an area printed with an achromatic color K and an area printed with PCBk which areas are adjacent to each other and thereby select a patch with a PCBk area having the least color difference from the area of achromatic color K. Thus, the precision of visual detection can be improved. This method is hereinafter called an "adjacency comparison method".

As described above, the precision of visual detection of color difference (color deviation) can generally be improved by using the adjacency comparison method. However, the conventional test pattern shown in FIG. 1 has some points to be improved in performing appropriate color deviation detection.

More specifically, the adjacency comparison method, as described above, has relatively high detection accuracy and therefore the detection accuracy may not match a variation width of the output characteristic of the printing apparatus for each colorant. For example, the output characteristic may vary relatively widely depending on the printing apparatus and, in such a case, the color difference between the patches are set large to make the correction width correspondingly large. In this case, because the detection accuracy of the adjacency comparison method is high, the color of the test area may look different at some degree from the achromatic color of the reference area in any of the patch, making it impossible to identify one patch that corresponds to the color deviation.

Also, when the perceptive characteristics for the two areas during the adjacency comparison are not equal, a correct comparison cannot be made.

The adjacency comparison method is intended to identify a test area that exhibits the color most close to an achromatic color. That is, it is desired that the color difference of the test area with respect to the reference area is perceived as a difference in a saturation, one of a variety kinds of color representing elements. However, it may not be possible with the conventional test pattern shown in FIG. 1 because the human perceptive characteristic of recognizing the patch color may not be able to strongly perceive the saturation difference, depending on the patch being checked.

SUMMARY OF THE INVENTION

The object of the present invention is to provide a test pattern printing method, an information processing apparatus and a printing apparatus capable of printing a test pattern that allows the visual color deviation detection to be performed appropriately and highly accurately during the processing for correcting a color deviation caused by output characteristic variations of the printing apparatus among the colorants.

In the first aspect of the present invention, there is provided a test pattern printing method of printing a test pattern used in correction processing, the correction processing making an output characteristic for each of a plurality of colorants a predetermined one to correct a color deviation, the method comprising the step of:

printing a plurality of patches each of which has a test area and a reference area placed adjacent to each other, the test area being printed with a mixture of the plurality of colorants and serving as an indicator for indicating a degree of the color deviation and the reference area serving as a reference to be compared with the test area for the color deviation, the plurality of patches being printed at different mixing ratios of the plurality of colorants, respectively;

wherein the test area and the reference area are arranged in each of the plurality of patches so that the test area and the reference area are repeated alternately.

In the second aspect of the present invention, there is provided an information processing apparatus for performing a process of printing a test pattern used in correction processing, the correction processing making an output characteristic for each of a plurality of colorants a predetermined one to correct a color deviation in printing by a printing apparatus, the apparatus including:

a unit for causing the printing apparatus to print a plurality of patches each of which has a test area and a reference area placed adjacent to each other, the test area being printed with a mixture of the plurality of colorants and serving as an indicator for indicating a degree of the color deviation and the reference area serving as a reference to be compared with the test area for the color deviation, the plurality of patches being printed at different mixing ratios of the plurality of colorants, respectively;

wherein the test area and the reference area are arranged in each of the plurality of patches so that the test area and the reference area are repeated alternately.

In the third aspect of the present invention, there is provided a printing apparatus capable of printing a test pattern used in correction processing, the correction processing making an output characteristic for each of a plurality of colorants a predetermined one to correct a color deviation, the apparatus including:

a unit for printing a plurality of patches each of which has a test area and a reference area placed adjacent to each other, the test area being printed with a mixture of the plurality of colorants and serving as an indicator for indicating a degree of the color deviation and the reference area serving as a reference to be compared with the test area for the color deviation, the plurality of patches being printed at different mixing ratios of the plurality of colorants, respectively;

wherein the test area and the reference area are arranged in each of the plurality of patches so that the test area and the reference area are repeated alternately.

According to the above construction, the patches each have a test area and a reference area arranged adjacent to each other and these two areas are repeated alternately. Hence, a degree to which the colors of the two areas when compared tend to be perceived as different is alleviated according to a number of repetitions of the two areas. Therefore, for example, when a correction amount at which an output characteristic variation is corrected based on the patch selection is set at not so large a value, the number of repetitions of the two areas of each of patches can be determined according to the correction amount. Among these patches, when selecting a patch that exhibits the most color uniformity with not so large perceivable color difference between the two areas, the selected patch is one corresponding to the color deviation equivalent to the correction amount.

The above and other objects, effects, features and advantages of the present invention will become more apparent from the following description of embodiments thereof taken in conjunction with the accompanying drawings.

BRIEF DESCRIPTION OF THE DRAWINGS

FIG. 1 is a diagram showing a conventional test pattern used for detecting a color deviation;

FIG. 7 is a diagram showing a test pattern used for detecting the color deviation according to a first embodiment of the present invention;

FIG. 10 is a diagram showing a test pattern according to a third embodiment of the present invention;

FIG. 11 is a diagram showing a test pattern according to a fourth embodiment of the present invention;

FIG. 12 is a diagram showing a test pattern according to a fifth embodiment of the present invention;

DETAILED DESCRIPTION OF PREFERRED EMBODIMENTS

Embodiments of the present invention will be described in detail by referring to the accompanying drawings.
Summary In one embodiment of the present invention, a method of detecting the C, M and Y output characteristics of the ink jet printing apparatus involves printing a test pattern which is made up of a plurality of columns of patches, each having a PCBk area (test area) with the C, M, Y color balance (printing duty or gradation value data) changed, and selecting by the adjacency comparison method a patch having a test area whose color is closest to a achromatic color of a reference area. In each of the patches of this test pattern, the test area and the reference area are set adjacent to each other and are repeated alternately. Even if colors of the test area and the reference area look different when only one pair of these two areas is used for the patch, the alternately repeated pattern moderates a recognition precision level on the adjacency comparison and thereby makes it possible to identify a patch that exhibits some level of color evenness between the two areas of the patch. Then, this patch exhibiting the color evenness is selected as a patch selected on the adjacency comparison.

In another embodiment which has the patches of the alternately repeated pattern in the test pattern, the reference area is printed with a mixture of chromatic C, M, Y color inks in addition to a K ink. Further, printing duties of C, M and Y inks in the reference area is set almost equal to those of the test area in that patch. This reduces a spatial frequency difference between the test area and the reference area in each patch, makes the perceptive characteristics of the both areas being compared equal and improves the precision with which to detect the color deviation.

In addition to the above arrangement, the patches are generated in the gradation range of each of the C, M and Y colors that make a saturation difference between test areas of patches large so that the color difference between the test areas of the patches can be recognized easily. Further, considering a fact that humans perceive a change in lightness more easily than a change in saturation as a color difference, the patches are printed in each gradation range of C, M and Y in which the lightness change is small, in order to prevent the human perception of a saturation change from being disturbed by the lightness change.

The output characteristic deviations of the color print heads thus obtained are corrected by selecting, from among a plurality of output γ tables set beforehand, an output γ correction table corresponding to the selected patch and by rewriting the output γ correction table used for the image processing with the selected table.

First Embodiment

Figure 2:
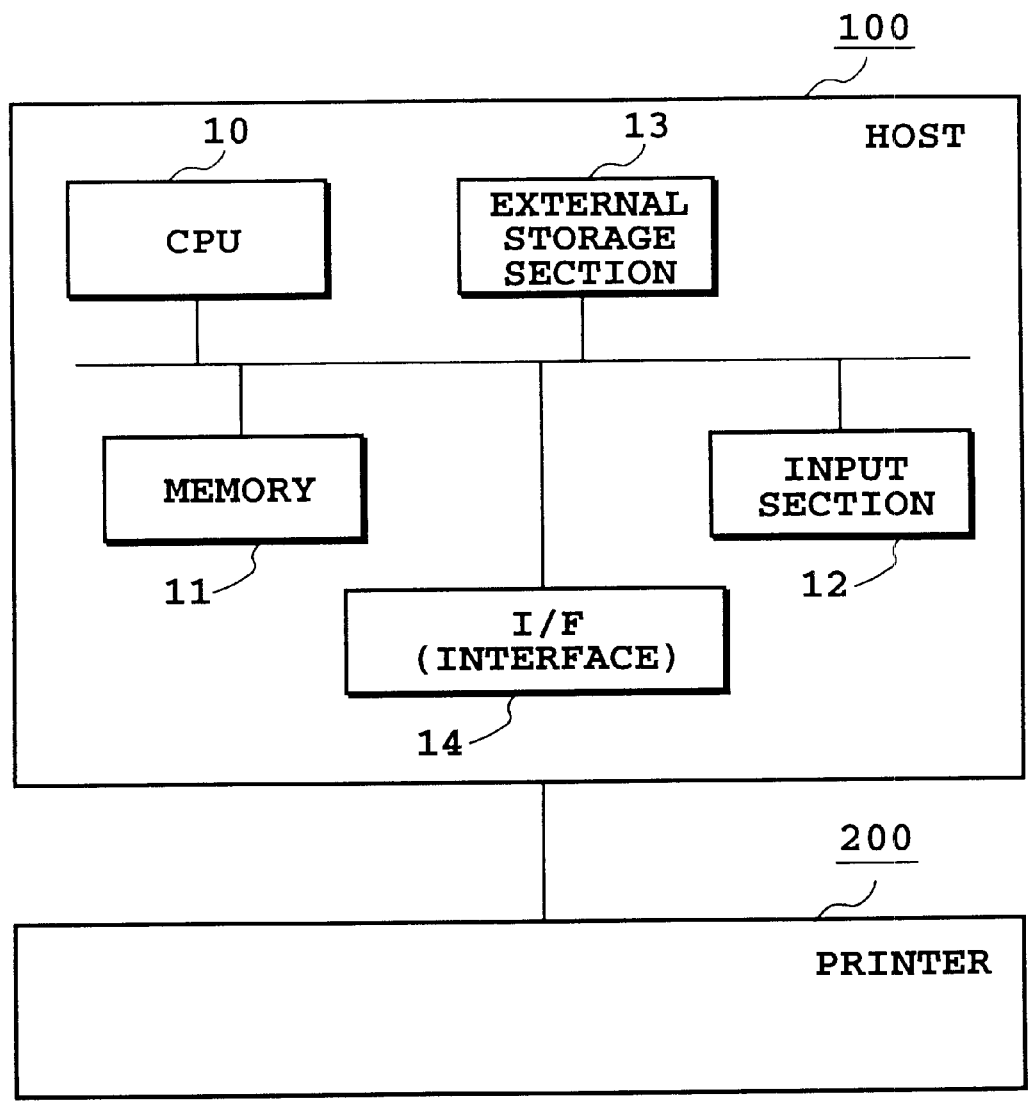
FIG. 2 is a block diagram showing an image processing system as one embodiment of the present invention.

FIG. 2 is a block diagram showing a configuration of the image processing system according to a first embodiment of the present invention.

In the figure, a host 100 as an information processing apparatus is realized by a personal computer for example and includes a CPU 10, a memory 11, an external storage section 13, an input section 12 such as keyboard, and an interface for communication with a printer 200. The CPU 10, according to programs loaded in the memory 11, executes a variety of processing, which includes in particular image processing, such as color processing and quantification processing described later, and correction processing for an output characteristic pertinent to this embodiment. These programs are stored in the external storage 13 or loaded from external devices. The host 100 is connected to the printer 200 as a printing apparatus through the interface and supplies print data that has undergone the image processing to the printer 200 for printing.

Configuration of the Printer

Figure 3:
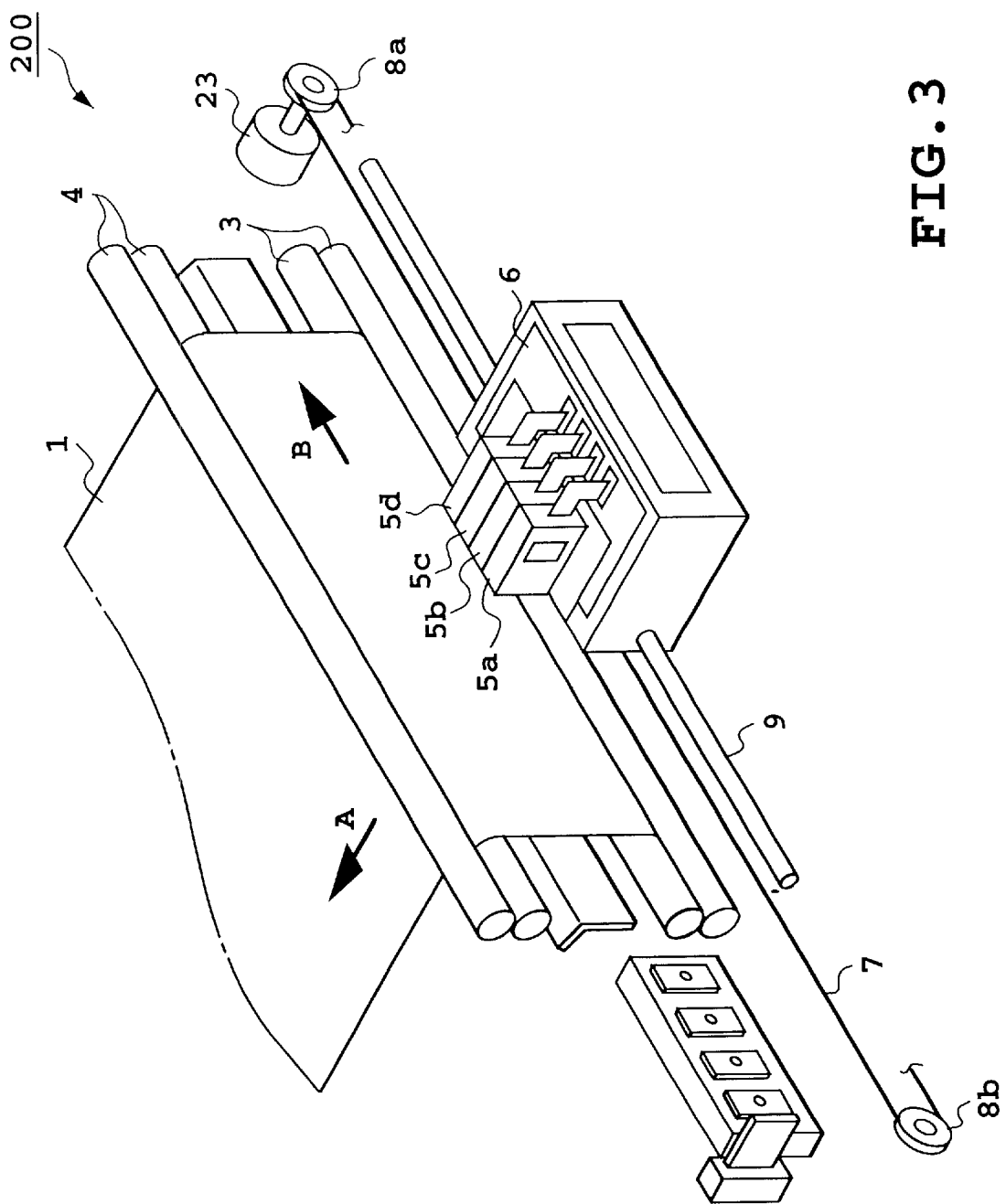
FIG. 3 is a perspective view showing a mechanism of an essential part of an ink jet printer in the image processing system.

FIG. 3 is a perspective view schematically showing a mechanical construction of the printer 200.

In FIG. 3, reference number 1 designates a recording sheet such as paper or plastic sheet. A plurality of such sheets is stacked in a cassette and, during a printing operation, the sheets are separated to be supplied as one sheet by means of feed rollers (not shown). The supplied sheet is then, by a first feed roller pair 3 and a second feed roller pair 4, fed at a predetermined distance in the direction of arrow A in the figure for each timing corresponding to scanning of a print head. The both roller pairs are arranged a predetermined interval apart and are driven by associated stepping motors (not shown).

Designated 5a, 5b, 5c and 5d are print heads of an ink jet system that eject ink against the recording sheet 1 for printing, respectively. The ink for each print head is supplied from a corresponding ink cartridge not shown. The respective print heads are driven in response to ink ejection signals to eject inks of respective cyan(C), magenta(M), yellow(Y), black(K) from their ejection openings. In more detail, in an ink path corresponding to each ejection opening of the print head there is provided an electro-thermal transducer, which generates a thermal energy to form a bubble in the ink to eject ink by the pressure of the bubble. The print heads 5a, 5b, 5c and 5d and the ink cartridge are mounted on a carriage 6. The carriage 6 is driven with a driving force of a carriage motor 23 transmitted through a belt 7 and pulleys 8a, 8b so as to move reciprocally along a guide shaft 9 to perform the scanning of the print head.

In the above construction, the print heads 5a, 5b, 5c and 5d, while being scanned in the direction of arrow B in the figure, ejects respective inks onto the recording sheet 1 in response to the ink ejection signals to form ink dots on the recording sheet 1, thus performing printing. The print heads 5a, 5b, 5c and 5d move to a home position, as required, and subjected to an ink ejection recovery operation by an ejection recovery unit 2 to prevent or eliminate clogging of the ejection openings. Further, in synchronism with the scanning of the print heads 5a, 5b, 5c and 5d, the feed roller pairs 3, 4 are driven to feed the recording sheet 1 at a distance corresponding to one line of the scanning of the print head, in the direction of arrow A. By repeating this operation an image can be printed on the recording sheet 1.

Figure 4:
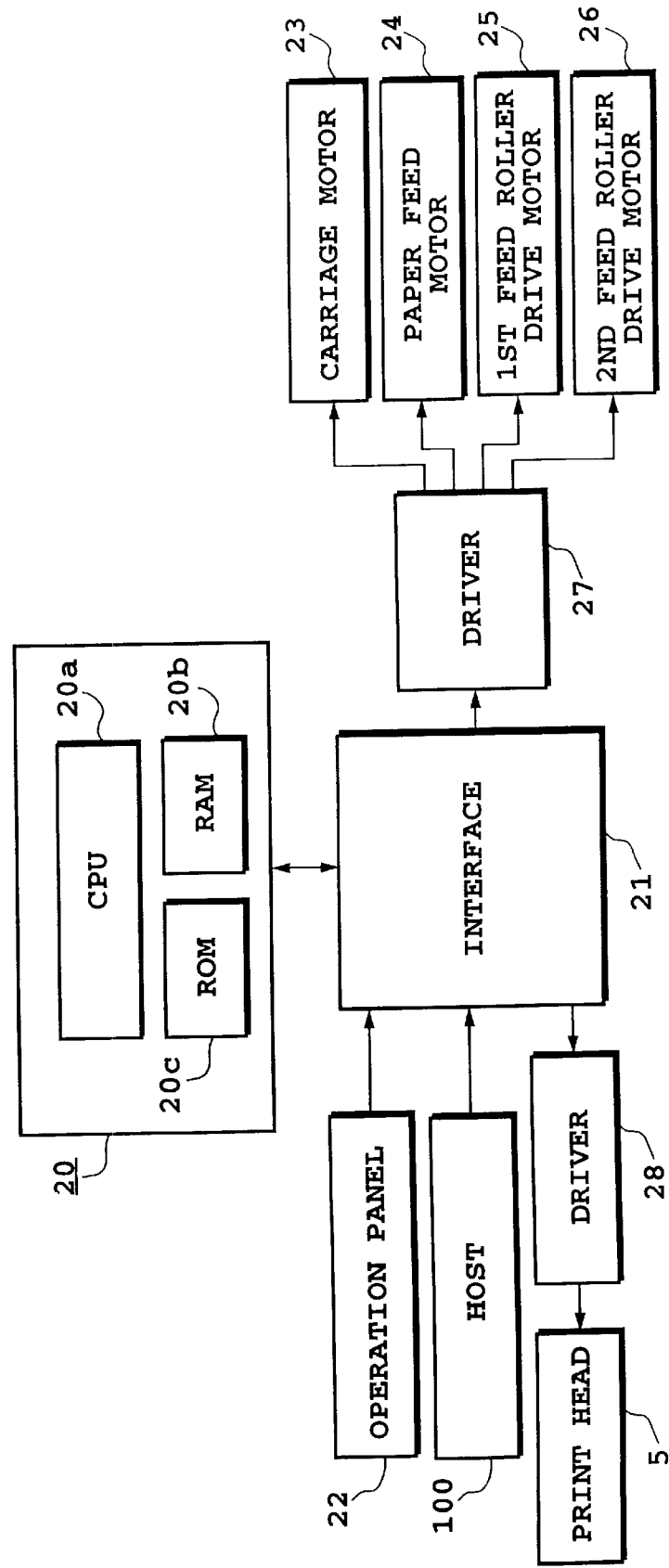
FIG. 4 is a block diagram showing a control configuration of the printer.

FIG. 4 is a block diagram showing a control configuration of the printer.

The control system, as shown in FIG. 4, has a control section 20, which includes a CPU 20a such as microprocessor, a ROM 20c storing control programs and various data for the CPU 20a and a RAM 20b used as a work area for the CPU 20a and temporarily storing various data such as print data; an interface 21; an operation panel 22; a driver 27 for driving a variety of motors (carriage drive motor 23, paper feed roller drive motor 24, first feed roller pair drive motor 25, and second feed roller pair drive motor 26); and a driver 28 for driving the print head 5.

In the above configuration, the control section 20 outputs and inputs data such as print data to and from the host 100 through the interface 21, and inputs a variety of information (such as character pitch, character kind, etc.) from the operation panel 22. Further, the control unit 20 outputs ON/OFF signals through the interface 21 to drive each of the motors 23–26 and also an ink ejection signal to the driver 28 to control the ink ejection operation of the print head.

Image Processing

Next, image processing performed when the host 100 generates print data to be used in the printer.

Figure 5:
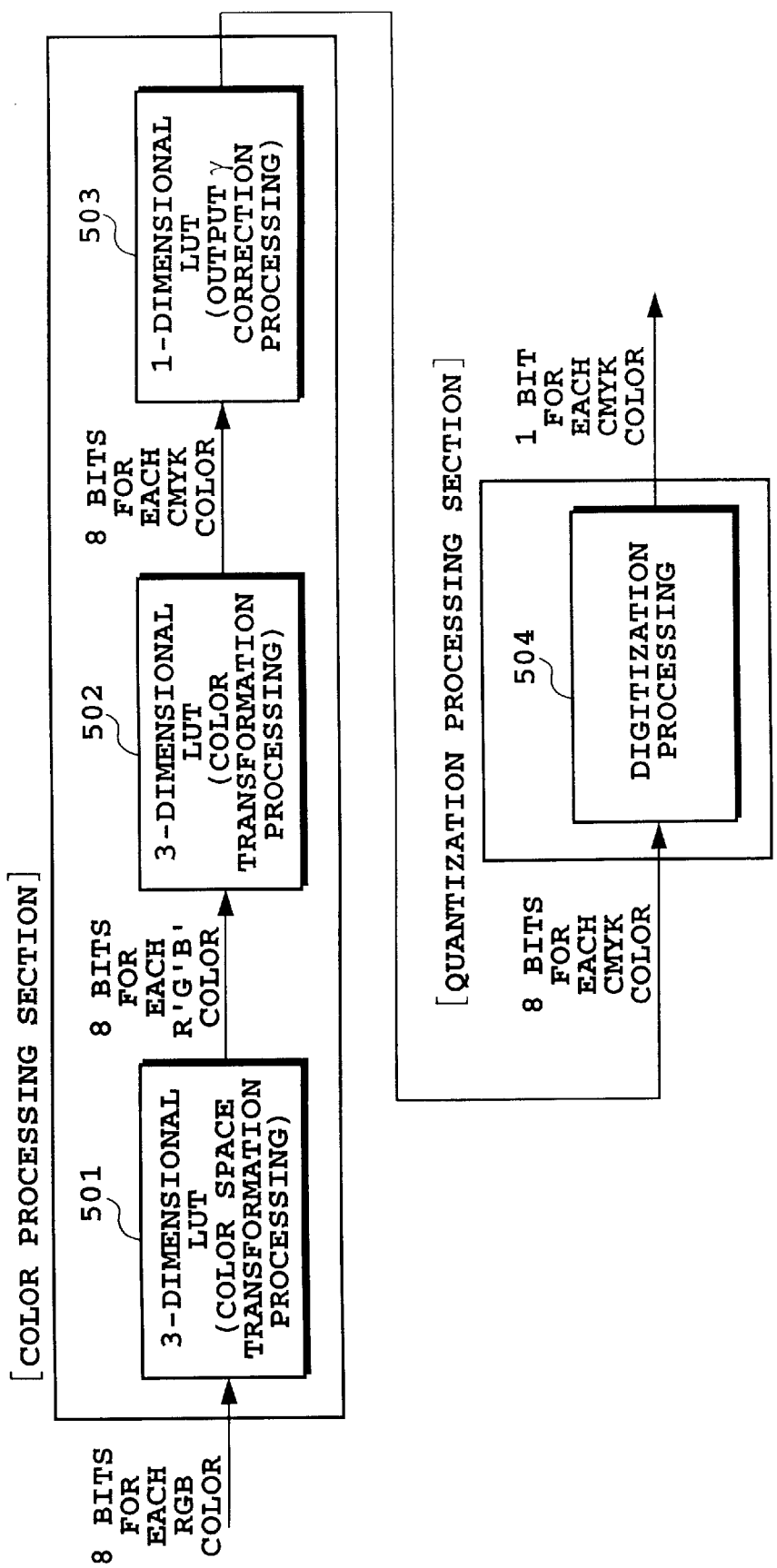
FIG. 5 is a block diagram showing an operation sequence of the image processing performed in the printer.

FIG. 5 is a block diagram showing a configuration for the image processing, by which input 8-bit image data (with 256 gradation values) for each red (R), green (G) and blue (B) color is eventually output as 1-bit image data for each color of cyan (C), magenta (M), yellow (Y), and black (K).

As shown in FIG. 5, 8-bit luminance data for each R, G, B color is first converted into 8-bit data for each R', G', B' color by using a three-dimensional lookup table (LUT) 501. The processing of converting the R, G, B data into the R', G', B' data is called first-stage color processing in which a color space transformation is performed to correct a difference between color space of input image represented by the R, G, B luminance data and color space reproducible by the printer 200. The 8-bit data for each R', G', B' color that has undergone the first-stage color processing is then converted into 8-bit data for each C, M, Y, K color by processing that uses a three-dimensional LUT 502 of the next stage. This color transformation processing is called second-stage color processing in which RGB data of an input system represented by luminance signal is converted into CMYK data of an output system represented with density signals. The later color processing is provided for following reason. The input data is usually generated as data of an additive mixing (process) of three primary colors (RGB) with respect to an illuminating element such as display and the printer on the other hand uses a subtractive mixing of three primary colors (CMY) which represents colors by the reflection of light.

Table data contained in the three-dimensional LUTs used in the first- and second-stage color processing does not cover all combinations of 8-bit data for each color because of limit on a memory capacity but is provided for only points having a predetermined spatial distance therebetween among all points represented by the above combination in the three-dimensional space. Hence, for other than the points lying in the predetermined distance, the transformation of the 8-bit data is done by using an interpolation. The interpolation is a known technique and therefore its explanation is omitted here.

The 8-bit data for each C, M, Y, K color that has undergone the secondstage processing is subjected to an output γ correction by means of a one dimensional LUT 503 for each color. This processing is performed for a reason that a number of dots printed in unit area of a recording medium and an output characteristic such as reflection density obtained by measuring the printed dots do not usually have a linear relation with each other. Therefore, performing the output γ correction can realize the linear relationship between the 8-bit input gradation level of each C, M, Y, K color and the density level of the printed image.

Generally, the output γ correction table prepared for a print head that performs an average output characteristic is often used. However, the print heads generally have or produce among themselves output characteristic variations and thus an optimum value of the γ correction parameter varies from one print head to another. For this reason, this embodiment, as described later, obtains information on a color deviation and, based on this information, performs a correction that allows the output γ correction table to be updated. For example, when the output characteristic of the print head for the cyan (C) colorant exceeds an expected value, the one-dimensional LUT associated with the γ correction of C is modified so that the table produces a slightly lower-than-expected output value for any input value. Whereby, the γ correction performed after the modification of the table ensures that the gradation in a printed image is reproduced in conformity to the expected one even when a print head that outputs the relatively strong C colorant is used.

After the output γ correction described above, digitization processing 504 is performed. The printer 200 of this embodiment is one of a binary printing system and thus the 8-bit data for each C, M, Y, K color is quantified into 1-bit data for each C, M, Y, K color. Then, these binary data are sent to the printer 200 as print data for respective print heads 5a, 5b, 5c, and 5d.

This embodiment uses an error diffusion method as a digitization technique so as to allow the printer 200 of binary printing system to realize a picture-like half-tone image showing smooth gradation change. The quantification using the error diffusion method is a known art and therefore its explanation is omitted here.

Color Deviation Detection Method and Correction Method

Next, a color deviation detection method and a correction method based on detected color deviation information according to this embodiment will be explained.

Figure 6:
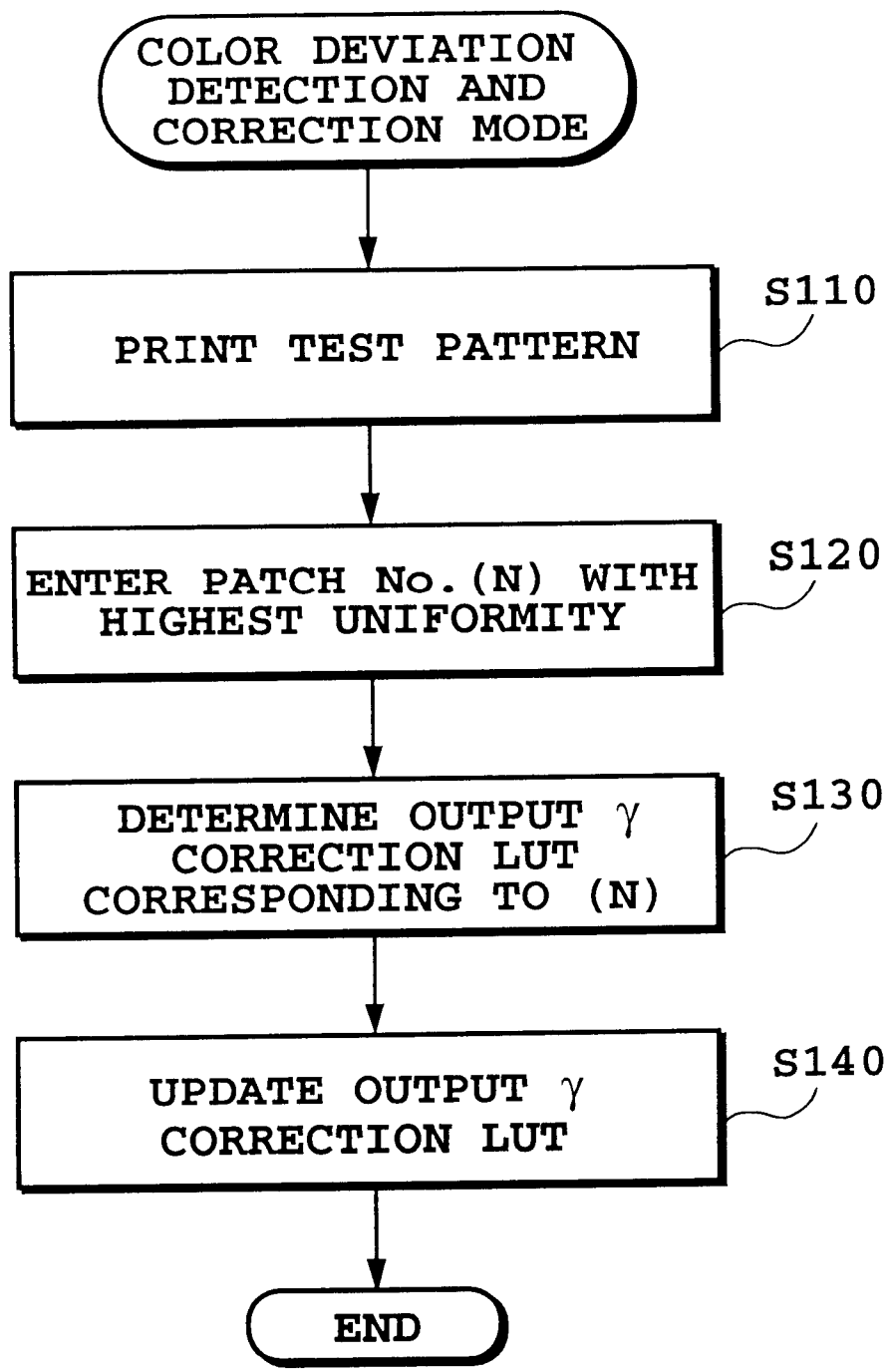
FIG. 6 is a flow chart showing a detection sequence of a color deviation and of a correction sequence of the color deviation, according to the embodiment of the present invention.

FIG. 6 is a flow chart showing processing executed in the host 100, the processing including processing for detecting a color deviation and performing correction based on the color deviation information.

The processing is started by a user selecting this detecting and correcting mode on a UI (user interface) picture displayed by a printer driver operating on the host 100. First, at step S110 the printer 200, which is an object to be corrected, is commanded to print a detection pattern used for detecting the color deviation. More specifically, the printer driver performs the above described image processing on detection pattern data consisting of gradation value data shown in FIG. 7, which is previously set and used for detecting information of individual differences in printing characteristics, and converts the pattern data, which has undergone the image processing, into bit image data. Then, the printer driver transfers print data of the detection pattern represented by the bit image data through the interface 14 (see FIG. 2) to the printer 200. When printing the detection pattern, the LUT for the output γ correction, which is used in the image processing, is one set to a default which has a linear input/output transformation relation and which outputs the input value as is.

FIG. 7 shows a test pattern to be printed in this embodiment.

The test pattern of this embodiment has patches each of which is made up by repeating one set or one pair of the test and reference areas shown in FIG. 1 twice vertically. That is, in each patch, the first and third areas are test areas in which the colorant mixing ratio changes and which are compared with the reference areas, and the second and fourth areas are reference areas that serve as a reference for comparison. In the test areas of the patch pattern shown in the figure the gradation value of cyan increases toward right in five 16-unit steps and the gradation value of magenta similarly increases downwardly in five 16-unit steps.

Figure 8:
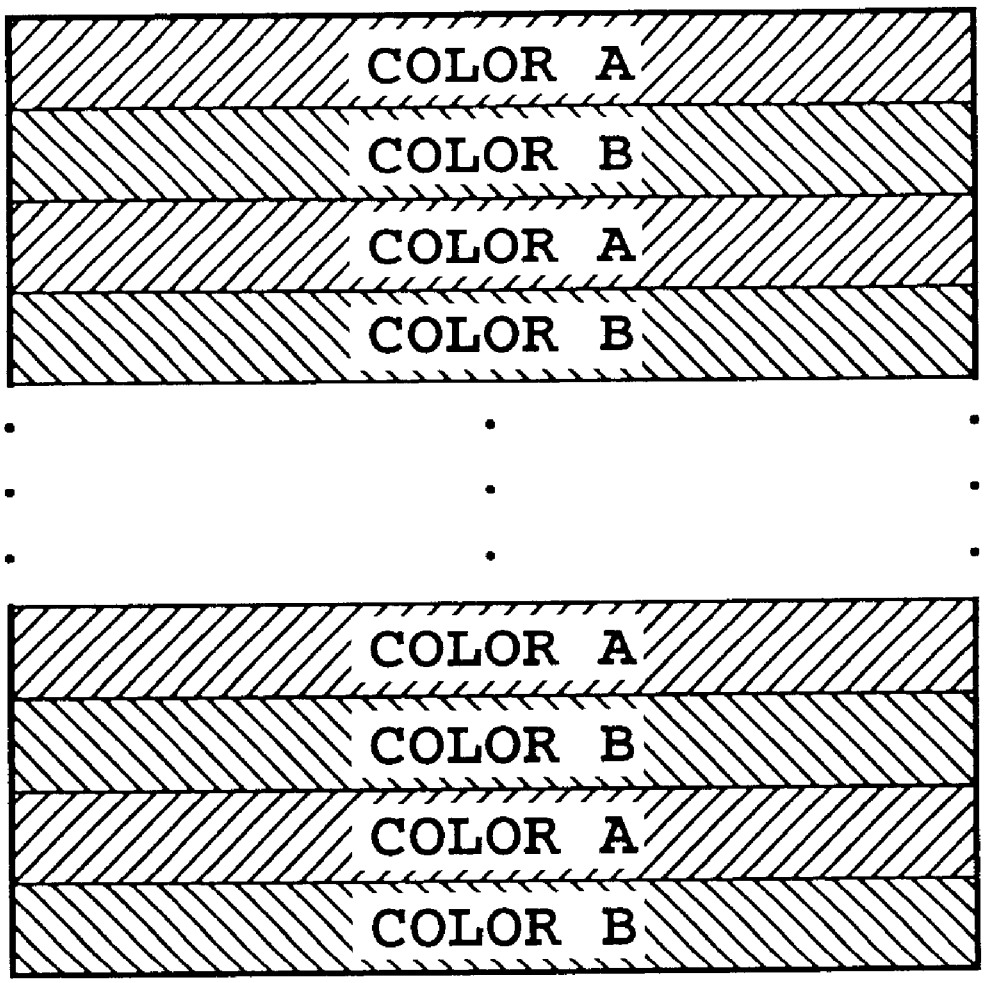
FIG. 8 is another example of the test pattern according to the first embodiment.

The parameters of the patch pattern, such as a number and direction of repetitions, can be set appropriately according to the colorants used in the printing apparatus and are not limited to those of the pattern shown in FIG. 7. For example, the patch pattern may be as shown in FIG. 8. FIG. 8 shows a patch pattern with an increased number of repetitions extending in one direction. In the figure, an area of color A corresponds to a test area and an area of color B corresponds to a reference area. The color A changes in the test pattern according to the mixing ratio (gradation value) of the three C, M, Y colors whereas the color B does not change. The color A areas and the color B areas have respectively stripe shape and the strips are arranged alternately to form one patch pattern. In the following the number of repetitions of such stripes in a particular patch is referred to simply as a "frequency."

Referring back to FIG. 6, after the printing of the test pattern (step S110), the user visually checks the test pattern and selects a patch that exhibits the highest uniformity, and then at step S120 enters the selected patch number. The patch number entered by the user through the UI screen is stored in a predetermined memory location. Here, "uniformity" on user's visual check means that periodic repetitions of the strips pattern of the patch made up by repeating strips as described above is not so conspicuous.

The test pattern of this embodiment is so constructed that, if the color print heads have no colorant ejection amount deviation, a center patch Ps (C=M=Y=128) in FIG. 7 is selected as having the highest color uniformity. In other words, the output γ correction LUT for each color used to print a test pattern and set by default is an LUT that is set when the print heads mounted have an output characteristic (ink ejection amount) that will result in this patch Ps exhibiting the highest color uniformity, i.e., when the actual density balance among the colors is optimum.

On the other hand, when a patch other than the patch Ps in the test pattern of FIG. 7 should be selected as having the highest color uniformity, the printing apparatus that has printed the test pattern is understood to have an output characteristic imbalance among the C, M, Y print heads (i.e., have the color deviation). In this embodiment, 25 selectable patches are provided as shown in FIG. 7, and to what degree the balance of the printing characteristic (output characteristic) among the print heads deviates can be determined by selecting a patch which exhibits the highest color uniformity. Further, this embodiment provides in advance 25 one-dimensional LUTs (output γ correction tables) used to perform the γ correction to make the printing characteristic balance optimum according to the patch which has been selected.

Therefore, at step S130, the output γ correction LUT to be used for the image processing is chosen from among the 25 output γ correction LUTs according to the patch number information entered at step S120 and then, at step S140, the output γ correction table is updated by the chosen table. With the above processing the detection and update (correction of the correction table) are completed.

The updating of the output γ correction table is not limited to the table selection as described above. The input and output of the table may be modified by changing the address information of the table. Alternatively, in a system where an active output γ correction table is copied into a predetermined memory area, a newly selected output γ correction table may be copied into this area to update the output γ correction table. In either case, it is obvious that this invention is not limited by the way the output γ correction table is updated.

According to the test pattern of the shown embodiment, even when a patch having only one pair of test and reference areas is used for the adjacency comparison and the color difference which can be detected by means of the adjacency comparison is smaller than a change amount between test area of patches so that the patch whose colors of two areas are close to each other cannot be identified, the test pattern of this embodiment made up of repeating stripes of reference area and test area alternately makes it possible to balance detection accuracy and the change amount between the test areas. As a result, respective patches can be made so that a unit change amount of color between test areas is set correspondingly to the correction amount that matches the variation width of output characteristic (colorant ejection amount) of each color print head as well as the frequency of the stripes being set correspondingly to the correction amount. Accordingly, it is possible for the user to identify the patch exhibiting an overall color uniformity, a patch whose test area color can be regarded as being close to the achromatic color of the reference area. In other words, the human perceptive characteristic has a tendency that the higher the stripe frequency, the more difficult it becomes to identify the color difference between the stripes. This embodiment takes advantage of this fact to balance the detection precision of the adjacency comparison and the correction precision (correction width).

Too high a frequency, however, will make every patch exhibit uniformity, rendering the check difficult. At which frequency the stripes should be alternated varies depending on such design items as the print heads, inks and recording mediums used in the recording apparatus.

Although in the above embodiment the widths of the stripes of the color A and color B are described to be equal, they may differ. However, setting one of the two stripes too wide and the other too narrow makes the check for color uniformity difficult and thus is not desirable. Also while in the above embodiment the patch pattern is formed by horizontal stripes, it may use vertical stripes.

Further, in the above embodiment the reference area printed with only the K ink is treated as having an achromatic color. The K color actually used is not necessarily a pure achromatic color and is often a somewhat chromatic color slightly deviated from the achromatic color. Even in such a case, what is intended in this invention holds by setting the K, C, M, Y balance so that the center patch of FIG. 7 exhibits the highest color uniformity when the color print heads used have the central ejection amount with no deviation and the default output γ correction LUT is used.

Second Embodiment

Figure 9:
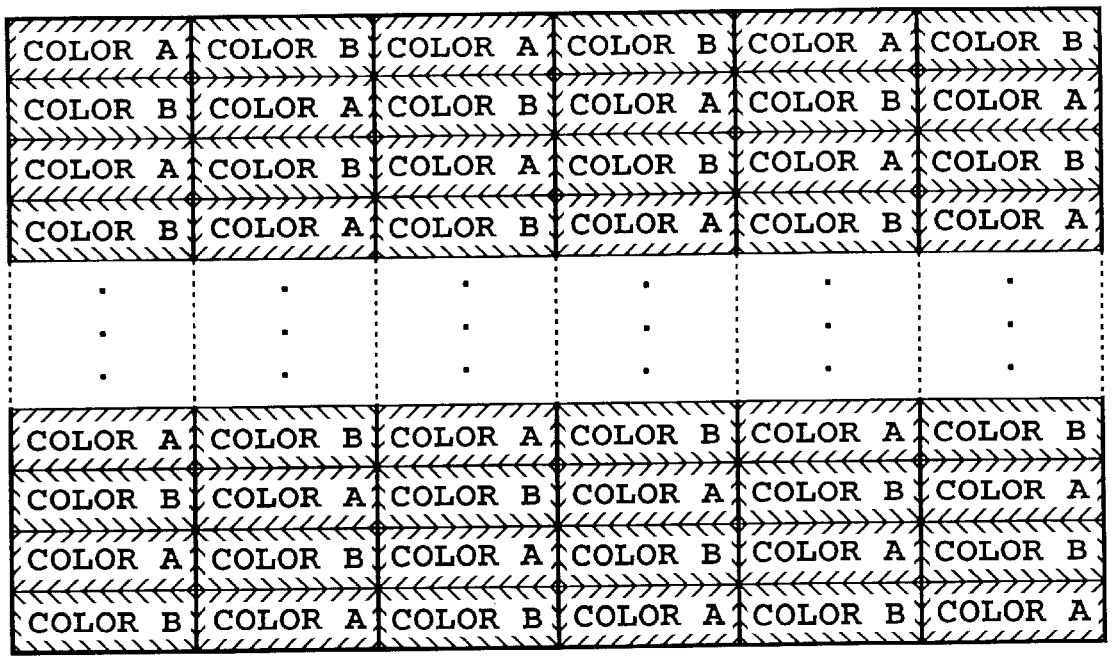
FIG. 9 is a diagram showing a test pattern according to a second embodiment of the present invention.

FIG. 9 shows a patch pattern according to the second embodiment of the present invention. As in FIG. 8 of the first embodiment, the color A and color B correspond to a test area and a reference area, respectively.

As shown in the figure, the color A area and color B area are arranged in a checkered pattern. The K, C, M, Y mixing ratios in the color A and color B change according to the position of the patch in FIG. 7, as in the first embodiment. The user selects a patch that exhibits the highest overall evenness (uniformity).

The size and shape of the checkered pattern similarly vary depending on such design items as the print heads output characteristics, colorants and colorant ejection amounts, and thus are not detailed here. What is intended in this embodiment lies in the fact that the areas with different colors exist in some periodicity. It is therefore needless to say that the shape of this checkered pattern does not need to be an exact square.

The construction, workings and effects of the patches, except for their layout, are similar to those of the first embodiment and are not detailed here.

Third Embodiment

In the patch pattern of the first embodiment, there may be correlation between the width of stripes and the color difference between the patches. Hence, if the stripe width is not set properly, there may be two or more patches that exhibit the uniformity or such a patch may not be found. The third embodiment provides a solution to this problem.

FIG. 10 shows a patch pattern according to the third embodiment of the present invention. As in FIG. 8 of the first embodiment, the color A and color B represent a test area and a reference area, respectively, and a plurality of such color areas form one patch.

As shown in FIG. 10, a patch has a plurality of horizontally arranged columns of alternately repeated color stripes A, B, with each column having a different stripe width. The K, C, M, Y mixing ratios in the color A area and the color B area change according to the patch position in FIG. 7 as in the first embodiment.

The user selects a patch with a largest area that appears uniform. The narrower the stripe width in one patch, the more uniform the column area tends to look even if the two colors are not close to each other. Conversely, the wider the stripe width in one patch, the less likely the color stripes are to appear uniform unless the two colors are close to each other. In other words, in the patch pattern of this embodiment shown in FIG. 10, the greater the stripe width to which the color stripes look uniform, the closer the color A and the color B in the patch are to each other in terms of color.

According to this embodiment, because each patch has a plurality of columns with different stripe widths, the color difference between different patches can be checked in a plurality of stages. This in turn increases the tolerance in the decision making and allows the user to make a decision based not only on a sensuous criterion of "whether the color stripes appear uniform" but also on a physical criterion of "up to which stripe width the color stripes appear uniform." Hence, the user can easily check how the patch looks in comparison with others.

Although the width, size and others of the stripes have increased design tolerances, their optimum values depend on other design items and thus are not described here. The construction of patches in this embodiment, except for layout and decision criteria, is similar to that of the first embodiment and therefore its detailed description is omitted here.

Fourth Embodiment

This embodiment does not concern the arrangement pattern of test areas and reference areas in a patch but gradation values (a mixing ratio) of C, M, Y and K colorants in the reference area of each patch.

FIG. 11 shows the same pattern as shown in FIG. 7 but with different C, M, Y, K mixing ratio. More specifically, in the first to third embodiments described above, the reference area is printed with only the K colorant as shown in FIG. 7. In this embodiment, on the other hand, the reference area is printed with a mixture of the achromatic K colorant and the chromatic C, M, Y colorants. The amount (gradation value) of each colorant is as follows. The amount of K colorant is one-half what is shown in FIG. 7 ($128 \times \frac{1}{2} = 64$), which is a fixed value for every patch. The amounts of chromatic colors in the reference area are one-half the amounts of the chromatic colors in the associated test area in each patch and determined according the patch position. Here, the gradation values shown in each patch correspond to print data for printing the patch and substantially correspond to the printing duty for the patch printed with use of binary data which is obtained by transforming the gradation values.

When the reference area is printed with only the K colorant, as shown in FIG. 7, the reference area has a lower K-dot density than the dot density in the test area and is thus influenced by a base or the recording medium to a greater degree, so that the color difference detected in comparison with the test area may be perceived more strongly. In this embodiment, however, the chromatic colorants in addition to the achromatic K colorant are used in the reference area so that the color difference between the test area and the reference area as detected by the adjacency comparison will not be perceived to be greater than it actually is. This reduces disturbances effecting the user decision when he or she selects a patch whose test area is closest in color to the reference area.

The mixing ratio of the achromatic K colorant and the chromatic C, M, Y colorants in the reference area and the amounts of colorants to be mixed are not limited to what is described above. When the dot coverage of the surface of the printing medium exceeds 100%, the influence of the printing medium as a base is alleviated. Hence, printing the test area and the reference area in a dot coverage range in excess of 100% can be expected to produce an effect of improving the detection accuracy. The mixing ratio of the C, M and Y should preferably not differ greatly between the test area and the reference area. This is explained as follows. Suppose the same C, M, Y mixing ratios are used in both the test area and the reference area, as in this embodiment. If the color of the test area produced by the balance of the chromatic colors C, M and Y is bluish for example, the same bluish tint is also printed, along with the achromatic K color, in the reference area. Hence, no problem arises. If the color of the reference area has a bluish tint because of the balance of C, M and Y, the user needs only to select a patch whose test area is closest in color to the reference area in order to select a patch closest to the achromatic color.

When a chromatic C, M, Y color balance different from that of the test area is used together with the K in the reference area, however the selection of a test area closest in color to the reference area does not necessarily mean that the selected patch has a test area closest to the achromatic color.

To what extent the difference in the mixing ratio (balance) of chromatic colors between the test area and the reference area can be tolerated varies depending on many factors including the physical property of inks and the resolution. Therefore, although the above-mentioned mixing ratio is among the design items for each product and its details are not given here, it is not recommended to use two sets of chromatic colors with greatly differing mixing ratios for the purpose of only making the dot coverage higher than 100%.

The construction of the patch pattern described in the preceding embodiments, except for the color arrangement in the reference area, may be used without contradicting the spirit of this embodiment.

In summary, the fourth embodiment is intended to make almost equal the dot densities (also referred to as a "spatial frequency") of the test area and the reference area in each patch of the test pattern of FIG. 7.

This embodiment sets the printing duties of the C, M, Y colors in the reference area equal to those of test area in the same patch. Compared with the patch in which the reference area is printed with only the K colorant as shown in FIG. 7, this embodiment can reduce the difference in spatial frequency between the test area and the reference area and thereby bring the perceptive characteristics of the two areas close to each other. Since the perceptive characteristics of the two areas can be made equal when identifying a patch that exhibits the color uniformity such as described in the above embodiments, a patch that best matches the output characteristics of the colorants can be identified with ease during the color deviation detection process.

Figure 14:
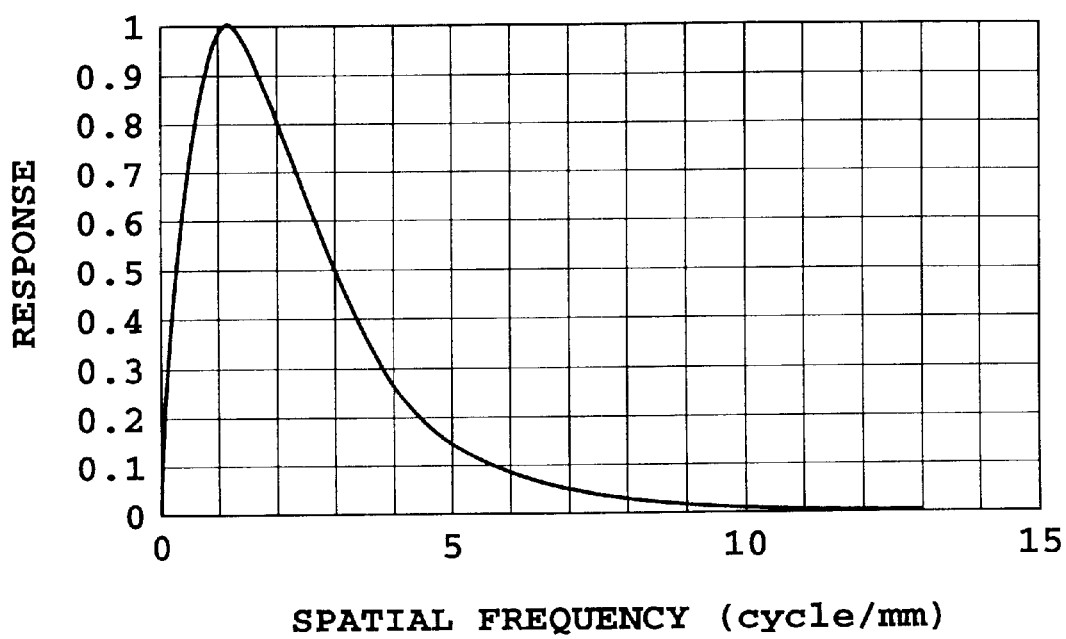
FIG. 14 is a graph showing a visual characteristic with respect to a spatial frequency as explained in the fourth embodiment.

FIG. 14 is a graph showing how the spatial frequency affects the perceptive characteristic. The graph is obtained by approximating with the Dooley equation a relationship between the capability of vision to reproduce an image, or response performance, and the spatial frequency of the image.

As is seen from FIG. 14, the capability of the human perceptive function to perceive a binary image made by existence or non-existence of dots depends largely on the spatial frequency of the image. Putting the test area and the reference area adjacent to each other when detecting their color difference can be expected to produce a certain effect of improving the detection accuracy, as described above. When the spatial frequencies of the two areas differ greatly, however, the response performance in recognizing these areas differ greatly. This may result in a situation where in every combination of the test area and the reference area the colors of these two areas are equally not close to each other (i.e., it is not possible to determine which combination provides a closest match in color between the two areas). Hence, this embodiment ensures that the test area and the reference area in each patch do not have significantly differing spatial frequencies and thereby enables the user to recognize the color uniformity in a patch more accurately.

Fifth Embodiment

FIG. 12 shows gradation data in a test pattern according to the fifth embodiment of the present invention. This embodiment uses, in particular, a lightness difference in checking the color difference.

Each of the patches in the test pattern of FIG. 12 has reference areas (at even-numbered positions) and test areas (odd-numbered positions) alternated as shown in FIG. 8. This embodiment has two test patterns: one has a series of horizontally arranged patches with the gradation value of M progressively changed; and another has a series of horizontally arranged patches with the gradation value of Y progressively changed. In each of these test patterns, chromatic C, M, Y colorants are used in both the reference areas and the test areas as in the preceding fourth embodiments. In the reference areas, the gradation values of the chromatic C, M, Y colorants are constant throughout all different patches and are determined such that the color of the reference area exhibits an achromatic color when the color print heads each have a central ejection characteristic with no deviation, with only the gradation value of C largely deviated from the other two. In the test areas of the patches in each test pattern, only the gradation value of M or Y colorant is changed, respectively. The gradation values of C and Y and the gradation values of C and M are set such that the test area exhibits an achromatic color when the print head of each colorant has the central ejection characteristic, respectively. The mixing ratios in the figure are shown only as one example and therefore may take different values.

In the above test patterns, the user selects a patch with the highest color uniformity as in the preceding embodiments. In FIG. 12, the two test patterns each have five patches, with the M gradation value changed in one test pattern and the Y gradation value changed in another. The center patches in the test patterns have the M and Y values set, respectively, so that the patches appear most uniform when the print head of each color has the central ejection characteristic.

The test pattern of this embodiment is constructed based on the detection principle described below.

The human visual characteristic in general is known to have a higher frequency response to the lightness than to the saturation. As described above, as the stripe width in a patch is reduced (frequency is increased), the color difference between the test area and the reference area becomes more difficult to recognize, which means the patch looks more uniform. The stripes with a higher frequency, the color difference due to the saturation difference becomes more difficult to be conspicuous due to the above stated human visual characteristic. Therefore, in this embodiment, to enable the color difference to be detected based on only the lightness difference, the saturation sensitivity is lowered by reducing the width of the stripes to increase the frequency in each patch of the test pattern.

As shown in FIG. 12, in the reference areas because the gradation value of only C is shifted a large predetermined value from the balanced gradation value that produces an achromatic color, the lightness can be shifted correspondingly from the lightness of the intended achromatic color. The amount of shift in the lightness can be changed from one patch to another by changing the gradation value of C. In the test areas, on the other hand, the gradation value of M or Y differs from those of the other two colorants, respectively. As the gradation value of M or Y changes from one patch to another, the lightness also changes accordingly. That is, in the color deviation detection of this embodiment, when the C-M ejection balance or C-Y ejection balance deviates from the central ejection characteristic, the lightness deviates from that of the balanced gradation value and therefore the match in lightness level between the test area and the reference area occurs in some other patch (other than the center patch), which looks most uniform.

Figure 13:
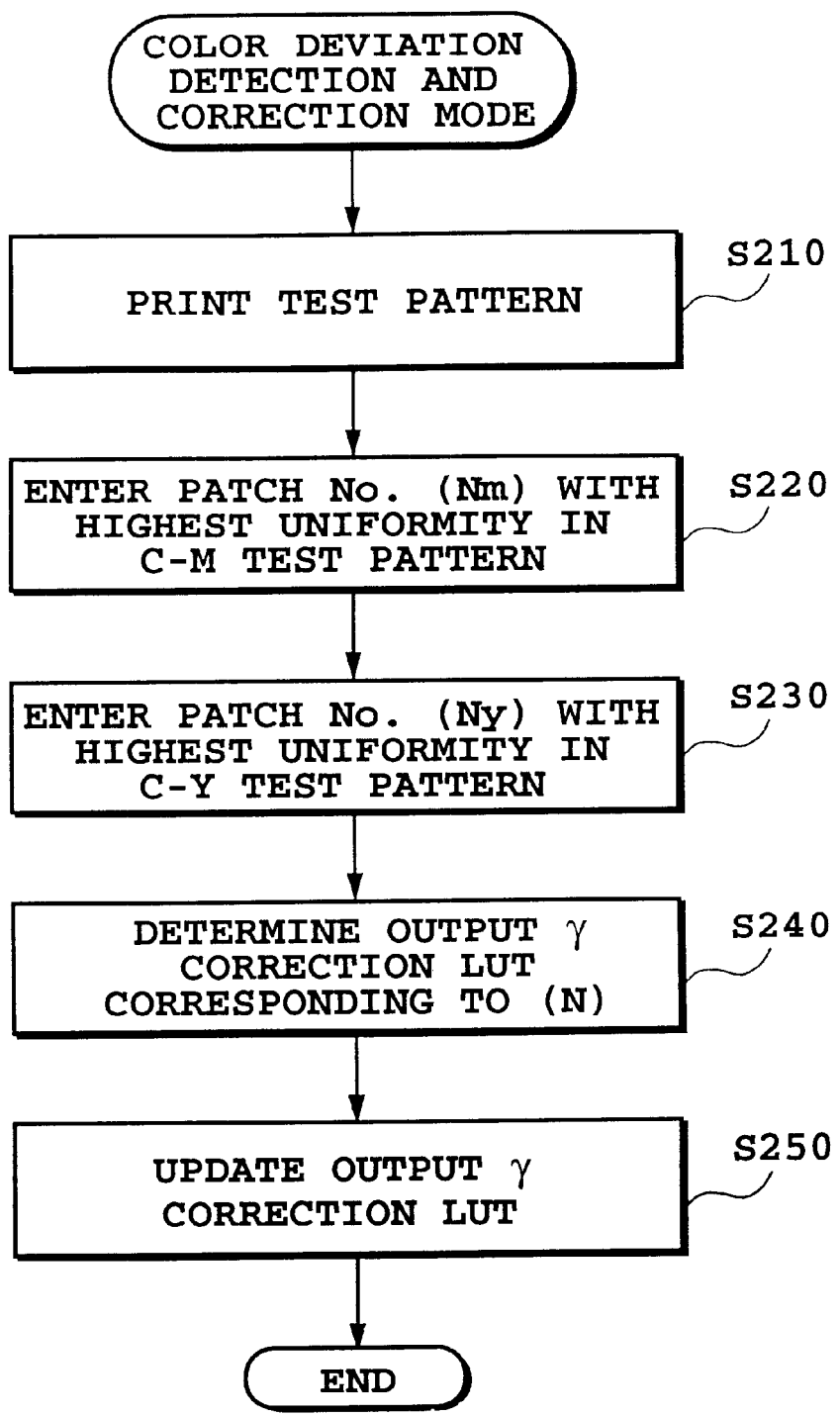
FIG. 13 is a flow chart showing a sequence of color deviation detection and a correction processing according to the fifth embodiment.

FIG. 13 is a flow chart showing a sequence of steps for the color deviation detection and the deviation correction according to this embodiment. This embodiment differs from the preceding embodiment shown in FIG. 6 in that the patch number is entered based on both of the C-M test pattern and C-Y test pattern.

In each of the test patterns shown in FIG. 12, a patch with balanced C-M gradation values or balanced C-Y gradation values is selected and these patch numbers are entered (steps S220, S230). Because the M or Y gradation value is balanced with respect to C taken as a reference, combining these two balance information can find a balance among the three colorants C, M, Y. That is, from among tables prepared beforehand according to the combinations of input values, a table that corresponds to the combination of inputs entered at steps S220 and S230 is selected to update and correct the output γ table.

In the conventional adjacency comparison method using an achromatic color, because the human visual characteristic is more sensitive to the lightness difference than to the saturation difference, there has been a problem of low user decision precision. For example, when an achromatic patch that should be selected based on the color balance may fail to be selected because it has the lightness different from that of the reference area. Instead, a chromatic patch which has the lightness closer to that of the reference area may get selected. With this embodiment, however, the color deviation detection sensitivity based on the saturation difference, which has a low sensitivity in the visual characteristic, is lowered so that the color deviation detection can be done by comparison based on only the lightness difference, which has a high sensitivity, thereby improving the user decision precision.

While this embodiment makes comparison between C and M colorants and between C and Y colorants, it is of course possible to make other combinations for comparison without deviating the scope of this invention. Further, if comparison is made between an achromatic color K and a chromatic color, it is possible to optimize the color balance between achromatic and chromatic colorants which has not been able to be obtained with a simple adjacency comparison because of low sensitivity for the saturation. Further, although in this embodiment the mixing ratio of C, M, Y colorants is set near the balanced C, M, Y gradation values that produce an achromatic color, it is not limited to this setting. This setting of the mixing ratio is intended to limit the saturation variation caused when the color balance is changed. Making comparison at too high saturation levels is not desirable because the original saturation difference may become greater than the lightness change making it impossible to select a patch with a highest color uniformity.

Further, although this embodiment has been described to have a patch layout of FIG. 8, the patterns as shown in FIGS. 9 and 10 may also be adopted. In that case, it should of course be noted that the optimum values of stripe width and shape depend on other design items.

Sixth Embodiment

A sixth embodiment constructs the patches so that mainly the saturation changes largely among the test areas of the patches in the test pattern.

In the test pattern of this embodiment, the test areas are printed with fixing the gradation value of one of three C, M, Y colors and changing the gradation values of the other two colors, as shown in FIG. 7. This embodiment is characterized by a method of determining the one color to be fixed and the remaining two colors to be changed in terms of gradation value when printing the patches and also by a method of determining the range (region) in which the gradation values are changed.

These characteristic methods will be explained by referring to FIGS. 15A, 15B and 15C and FIG. 16.

In forming an achromatic color by mixing three colors C, M, Y, the mixture ratio of three colors varies according to the gradation values of the colors. In the following, an expression "PCBk of gradation value A" is used for simplicity of explanation. The meaning of this expression is as follows. When three colors are printed in an intermixing manner to form a color of the test area, the mixed color formed with the maximum total number of dots of three colors C, M, Y and having the lowest lightness has the gradation value A=255 and the mixed color with the highest lightness (gradation value of each color=0) has the gradation value A=0. When the mixed color with such a lightness range is equally divided with the lightness taken as a reference, the value A changes from 0 to 255.

Figure 15A:
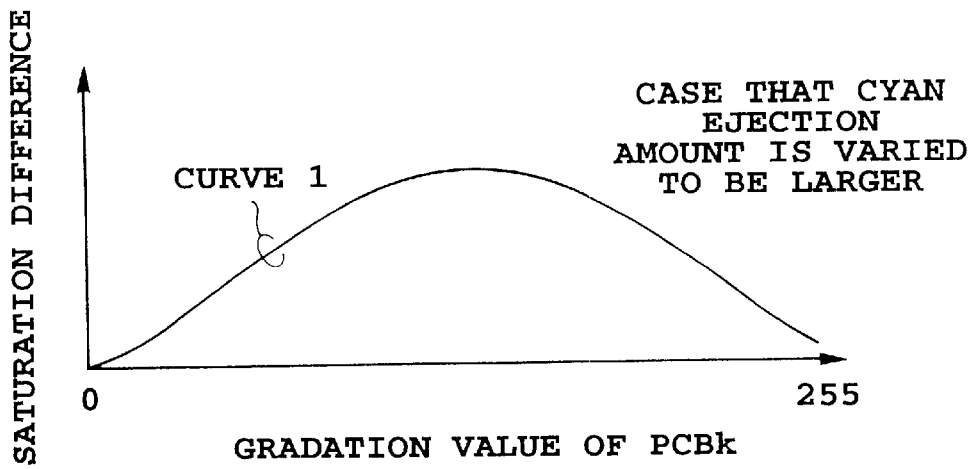
FIGS. 15A, 15B and 15C are graphs showing a relation between a gradation value and a saturation difference, as explained in a sixth embodiment of the invention.

FIG. 15A shows a smooth curve (curve 1) that schematically represents a saturation difference between the respective PCBk of two print conditions. The PCBk of one print condition is that the C, M and Y color print heads all have no deviation and is one of a central ejection characteristic and the PCBk of another print condition is that the colorant ejection amount of only the cyan print head is larger than that of other print heads by a predetermined amount. Then, measuring and comparing the two printed PCBk's at the same gradation value to determine the saturation difference while changing, from 0 to 255, the gradation value and plotting thus obtained saturation differences over the gradation range of 0 to 255. Although the real curve is not as smooth as shown due to an influence of the quantification process, ink characteristics and printing medium characteristics, it is shown as a smooth curve for simplicity of explanation.

As shown in the figure, as the gradation value of PCBk increases, the saturation difference progressively increases until it reaches its peak at a middle gradation value. As the gradation value further increases, the saturation difference decreases progressively.

Figure 15B:
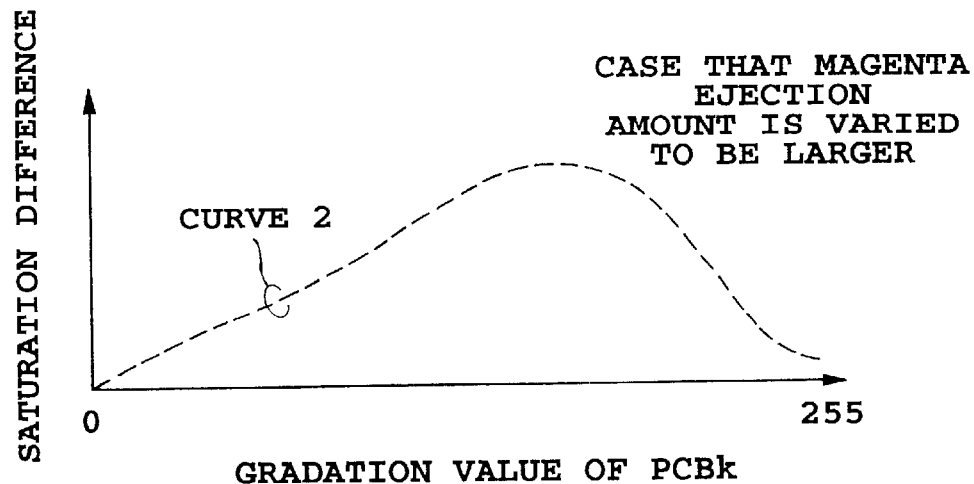
Figure 15C:
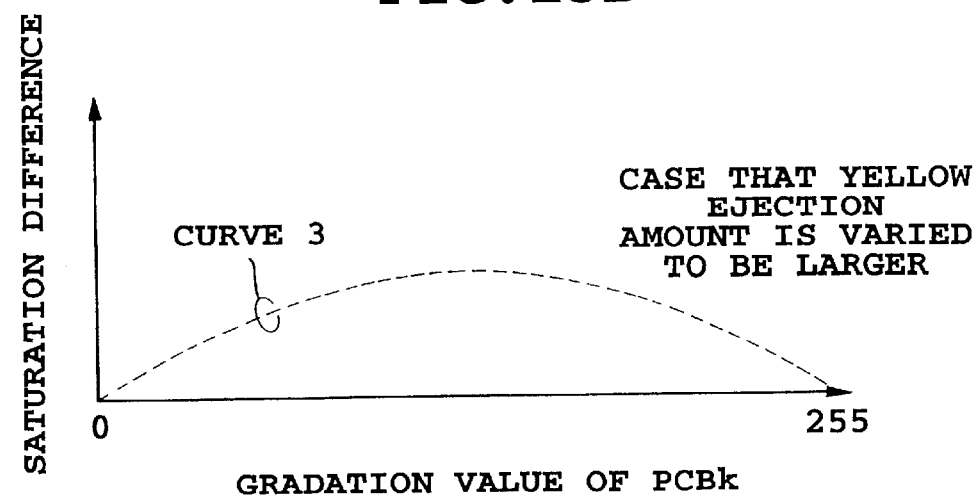

FIGS. 15B and 15C show schematically plotted smooth curves (curve 2, 3) representing the relations between the saturation difference and the gradation value of PCBk. These curves are obtained by printing the PCBk in the case of the C, M and Y color print heads each having a central ejection characteristic and by printing the PCBk in the case of only the magenta colorant in the case of FIG. 15B, or only the yellow colorant in the case of FIG. 15C, being ejected in an amount greater than other two colorants by the same predetermined amount as in the case with the cyan colorant; by determining, based on the result of color measurements, the saturation difference between the two PCBk's at the same gradation value; and by plotting the saturation difference over the gradation value range of between 0 and 255.

In these figures also, as the gradation value of the PCBk increases from 0, the saturation difference gradually increases until it reaches its peak at a middle gradation value. When the gradation value increases further, the saturation difference decreases.

As is seen from FIGS. 15A, 15B and 15C, the saturation differences for the three cases all exhibit the same tendency of change. It is also seen that, although the ejection amount is changed by the same amount (the predetermined amount described above) for all the C, M and Y colorants, the shape of the plotted curve (the maximum saturation difference, the gradation value at which the maximum saturation difference occurs, etc.), however, varies depending on which ink's ejection amount is changed. This is due to a variety of design items including the properties of ink dyes, their densities, permeation properties and color development characteristics on a printing medium, and an order in which inks of respective colors are ejected.

Figure 16:
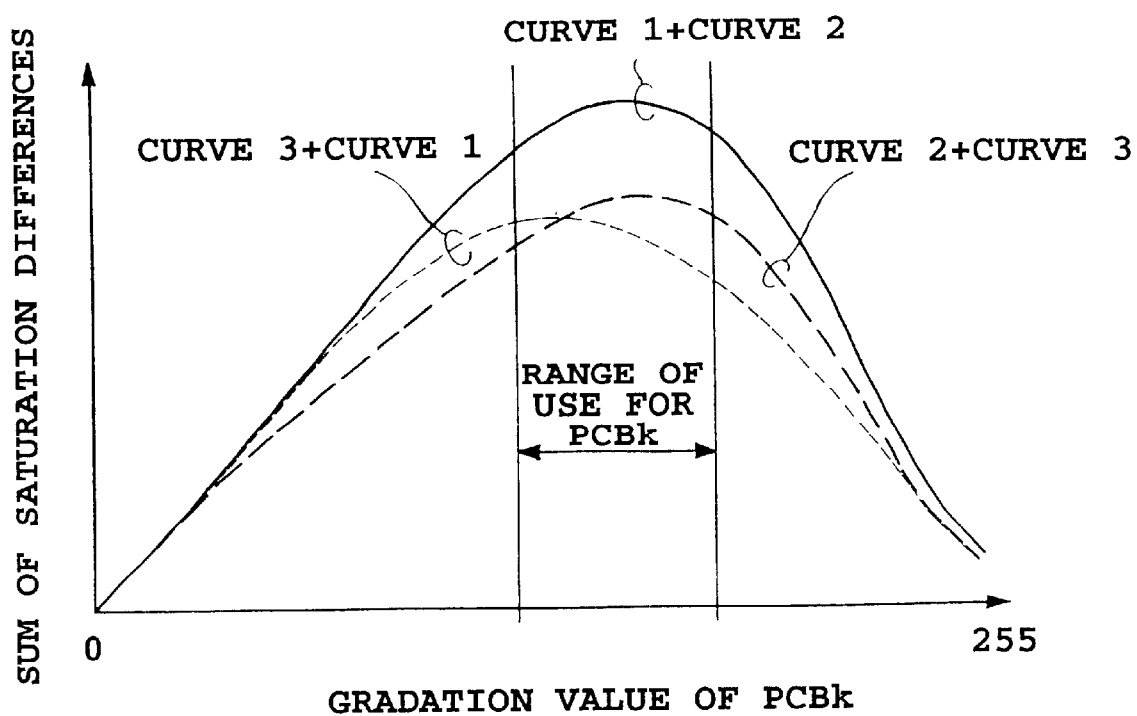
FIG. 16 is a graph showing a relation between a gradation value and a sum of saturation differences, as explained in the sixth embodiment.

FIG. 16 shows three curves each representing a combination or sum of two out of the three curves—curve 1, curve 2 and curve 3—shown in FIGS. 15A, 15B and 15C.

More specifically, the three synthesized curves shown in FIG. 16 are curve 1+curve 2, curve 2+curve 3, and curve 3+curve 1 respectively. Of these synthesized curves, the curve 1+curve 2 exhibits the largest value over the entire gradation range. In this embodiment, the colors corresponding to the curve 1+curve 2, i.e., cyan and magenta, are changed in the ejection amount of colorant and yellow is fixed when printing the test areas of the patches. The range of the gradation value for each color C, M, Y is set within a region (indicated as a "range of use" in the figure) in which the curve 1+curve 2 gives the largest value of a saturation difference and vicinity of the largest value.

By determining the one color whose colorant ejection amount is to be fixed and the remaining two colors whose ejection amounts are to be changed and determining the gradation range of these colors as described above, the saturation change (difference) among the printed patches produced as the two colors are changed in gradation value by predetermined amounts (the gradation value of magenta is changed by 15 units and that of cyan by 16 units) can be made large.

For example, the result shown in FIG. 15A represents the saturation difference between the PCBk printed by the C, M and Y heads all having the central ejection characteristic and the PCBk printed by increasing the colorant ejection amount for only the cyan print head when the two PCBk's being compared are regarded as having the same gradation values. The gradation range in which the color difference between the two PCBk's can be recognized well is not a region near the gradation value of 0 or 255 but a region close to an intermediate gradation value where the saturation difference is large. Similarly, in FIGS. 15B and 15C which show the saturation differences between the two PCBk's that are obtained by increasing the colorant ejection amount for only the magenta head (FIG. 15B) and only the yellow head (FIG. 15C), it is also seen that the test pattern should preferably be generated at the gradation value where the associated curve peaks and its nearby region. However, as these figures show, the gradation value at which the curve peaks differs from one parameter-changed color to another and the magnitude of the saturation difference also differs. When the test pattern is generated at a certain gradation value by changing the gradation parameters of two colors out of three while considering the balance among the three colors, it is necessary to optimize the conditions under which the gradation value for the curve's peak and the magnitude of the peak differ from one parameter-changed color to another. For this purpose, this embodiment combines two curves out of three to take a sum of each two curves, as shown in FIG. 16, and compares the three synthesized curves, which exhibit increased saturation differences, to determine the optimum gradation region. This produces a test pattern which, though not necessarily providing maximum sensitivity for each of the three colors, can provide a relatively large saturation difference for the two parameter-changed colors and a better visual sensitivity balance.

Although the above-described test pattern is generated based on a result of a color measurement which is made by changing the colorant ejection amount for each color and by measuring the printed colors, it is apparent that a similar result can be obtained also in a configuration that printing the patch is performed using the print heads with the same ejection amounts as well as changing the γ correction table and colors of the printed result is measured (i.e., changing the γ correction table causes change of respective amounts of ejected colorant inks for a unit area so that the change of respective amounts correspond to the deviated amount of the ejection amount for each color from the same ejection amount).

As described above, the test pattern of this embodiment renders the saturation difference (color difference) between the test areas (patches) recognizable particularly well, thus allowing the user to recognizing the difference in the uniformity between patches more preferably.

Modification of Sixth Embodiment

In the above embodiment the gradation value of each color is determined so as to make the saturation difference between the patches larger. This embodiment takes into account a lightness difference as well as the saturation difference in determining the gradation value of each patch. This will realize a test pattern with an improved recognizability. This embodiment uses inks different from those used in the first embodiment.

Figure 17A:
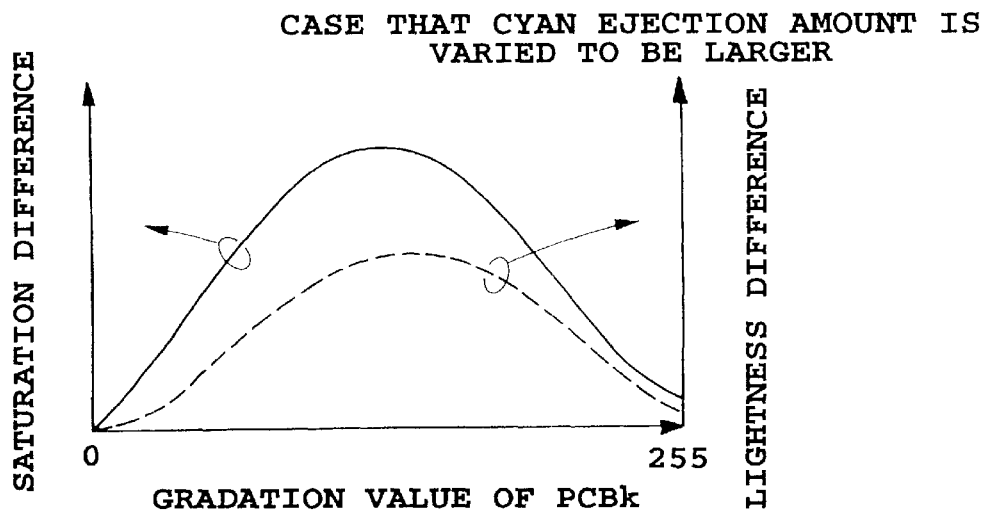
FIGS. 17A, 17B and 17C are graphs, as explained in the sixth embodiment, showing a relation between a gradation value and a difference between a saturation difference and a lightness difference.

FIG. 17A shows smooth curves that schematically represent the saturation difference and the lightness difference with respect to the gradation value of PCBk. These curves are obtained by printing the PCBk of three mixed colors with the C, M and Y color print heads all having no deviation from a central ink ejection characteristic and the PCBk of three mixed colors with the ink ejection amount of only the cyan print head increased by a predetermined amount; measuring and comparing the two printed PCBk's for the same gradation value to determine their saturation difference and lightness difference; repeating the above procedure for the gradation value from 0 to 255 at which to compare the two PCBk's; and plotting the saturation difference and the lightness difference over the gradation range of 0 to 255.

In this figure, the saturation difference increases progressively from the gradation value of 0, as in the first embodiment, until it reaches a peak at an intermediate gradation value. As the gradation value further increases, the saturation difference decreases. The lightness difference has the similar trend but the gradation value at which the lightness difference peaks differs from the gradation value for the peak of the saturation difference.

Generally, in a gradation region where dots are sparsely formed at a low printing duty, the relation between the lightness and the saturation changes linearly with the printing duty. When the dots are formed with ink, the fixing of ink dye on the paper surface depends on the permeation of ink solvent into an inner part of the paper and its drying on the paper surface. As the printing duty is increased until the dot coverage of the paper surface exceeds 100%, ink dots overlap each other on the paper surface, shifting the dye fixing balance which depends on the permeation and the drying toward the drying side. As a result, the density of dye at the paper surface increases. When the density of dye becomes higher than necessary, the color development generally deteriorates causing the color to become dull or darkish depending on the dye density of ink and the kind of dye. Thus the linearity of the relation between the lightness and the saturation is no longer maintained. This is considered to be a cause of the two curves of FIG. 17A having different peaks.

Figure 17B:
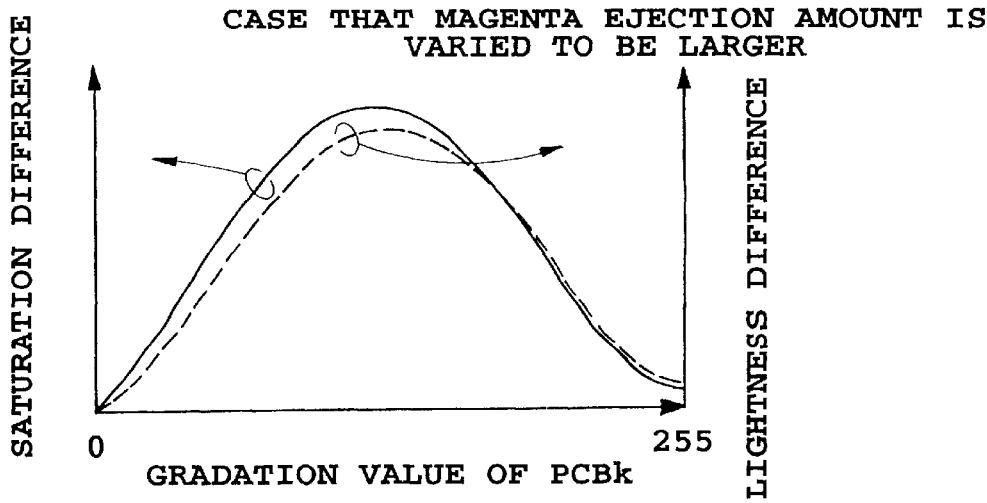
Figure 17C:
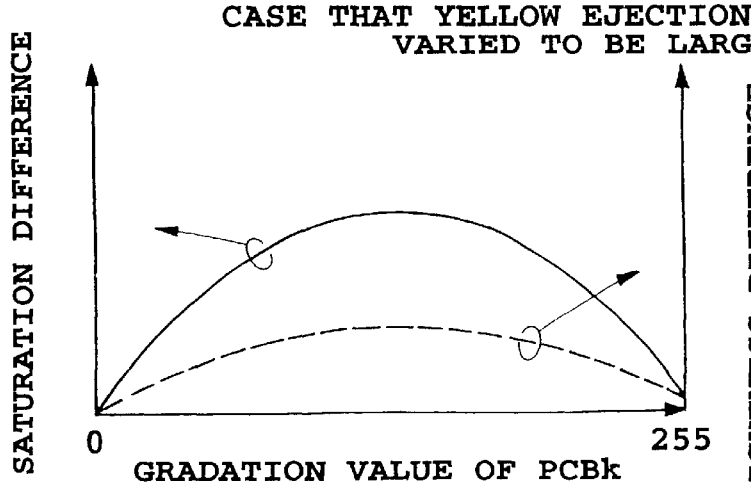

FIGS. 17B and 17C also show smooth curves that schematically represent the saturation difference and the lightness difference with respect to the gradation value of PCBk. These curves are obtained by printing the PCBk of three mixed colors with the C, M and Y color print heads all having no deviation from the central ink ejection characteristic and the PCBk of three mixed colors with the ink ejection amount of only the magenta head and the yellow head, respectively, increased by the same predetermined amount as in FIG. 17A; measuring and comparing the two printed PCBk's at the same gradation value to determine their saturation difference and the lightness difference; repeating the above procedure by changing the gradation value, from 0 to 255, at which to compare the two PCBk's; and plotting the saturation difference and the lightness difference over the gradation range of 0 to 255.

These figures also show that the saturation difference and the lightness difference exhibit the similar trend to that of FIG. 17A. Further, these diagrams are similar to the first embodiment in that, although the ink ejection amount is changed by the same predetermined amount for each of the C, M and Y colors, the characteristics of the PCBk—the saturation difference, the lightness difference, the shape of curve (the maximum value of curve and the gradation value at which the maximum value occurs) and the relation between the two curves—vary from one parameter-changed color to another. This is caused, as described earlier, by the properties of ink dyes, their densities, permeation capabilities and color development characteristics on the printing medium, and the order in which respective color inks are ejected.

Figure 18A:
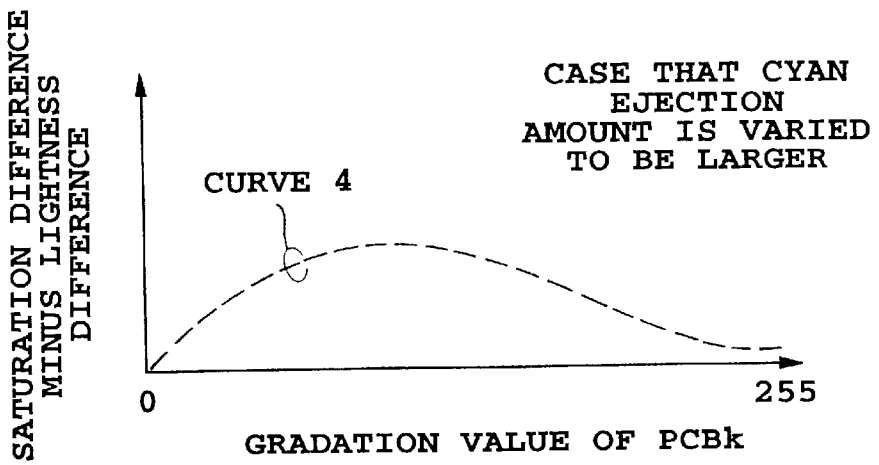
FIGS. 18A, 18B and 18C are graphs, as explained in the sixth embodiment, showing a relation between the gradation value and a difference between the saturation difference and the lightness difference.
Figure 18B:
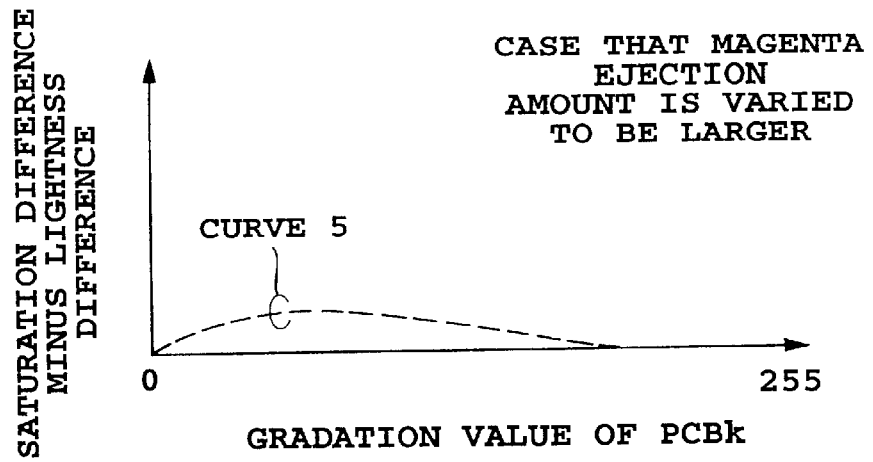
Figure 18C:
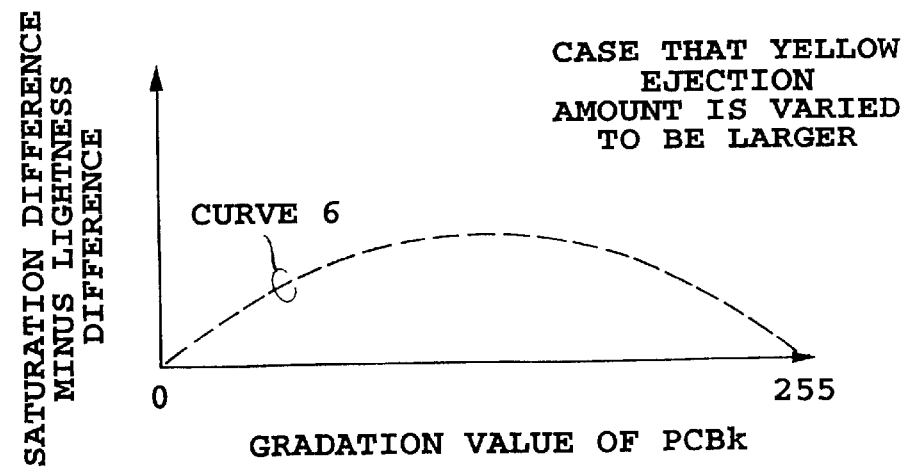

FIGS. 18A, 18B and 18C show a difference at the same gradation value between the two curves in each of FIGS. 17A, 17B and 17C, respectively, i.e., the difference between the saturation difference and the lightness difference or "saturation difference minus lightness difference" at each gradation value.

As is seen from FIGS. 17A–17C and FIGS. 18A–18C, in the case that the ejection amount of cyan is increased, the maximum value of the saturation difference increases and thus the maximum value of "saturation difference lightness difference" also increases. In the case that on the other hand the magenta ejection amount is increased, although the maximum value of the saturation difference is large, the maximum value of "saturation difference–lightness difference" is small. In the case that the yellow ejection amount is increased, although the maximum value of the saturation difference is small, the maximum value of "saturation difference–lightness difference" is large.

Figure 19:
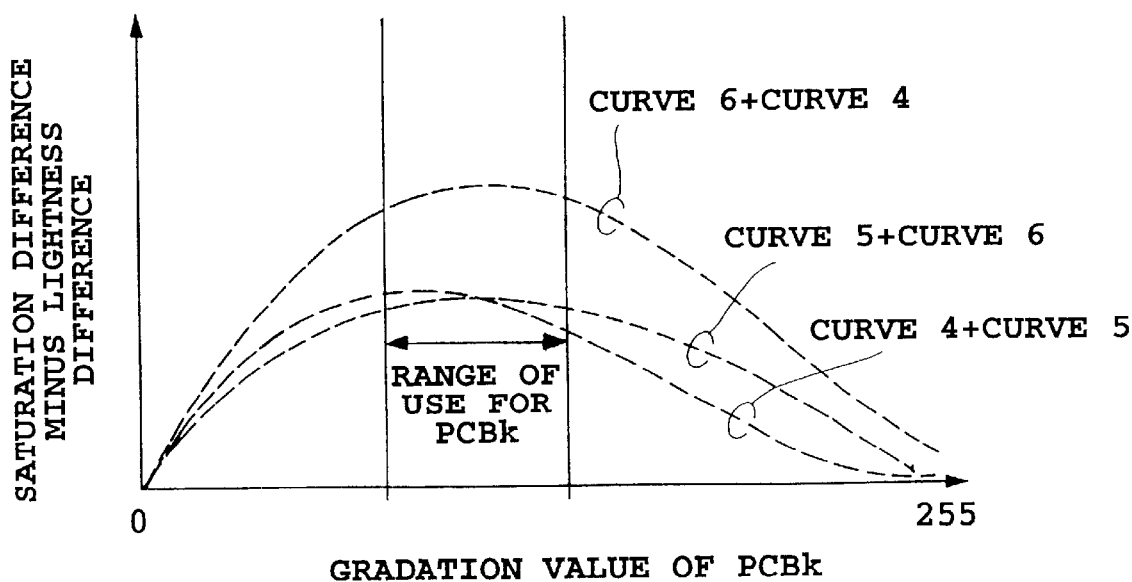
FIG. 19 is a graph, as explained in the sixth embodiment, showing a relation between the gradation value and the difference between the saturation difference and the lightness difference.

FIG. 19 shows three synthesized curves each representing the sum of two out of three curves (curve 4, 5 and 6) shown in FIGS. 18A, 18B and 18C.

More specifically, the three synthesized curves shown in FIG. 19 are curve 4+curve 5, curve 5+curve 6, and curve 6+curve 4. The curve that exhibits the largest value is the curve 6+curve 4. In this embodiment, a combination of colors corresponding to the curve 4+curve 6 are used. That is, cyan and yellow are changed in ink ejection amount and magenta is fixed when printing the patches. Further, the gradation range in which the ink ejection amount is varied is set close to the gradation value at which the curve 4+curve 6 gives the largest value and vicinity of this gradation value (indicated as "range of use" in the figure)

Printing the patches as described above allows highly accurate detection of the color deviation.

More specifically, as already explained in the first embodiment, the gradation range in which the saturation difference is large as well as the mixed color formed in this range is basically desirable for the color deviation detection. It is known, however, that the human visual perception is more sensitive to a lightness change than to a saturation change. This means that the human senses a color difference more strongly when only the lightness is changed than when only the saturation is changed by the same degree.

Hence, when the lightness as well as the saturation changes, the patch printing in this embodiment considers both the saturation difference and the lightness difference. Therefore, in order to suppress a lightness difference influence on the detection as much as possible, the "saturation difference–lightness difference" shown in FIGS. 18A, 18B and 18C is taken as a parameter and the patches are printed in the gradation range in which the saturation difference is large, that is, a gradation range in which the saturation difference is larger than the lightness difference. That is, as this parameter value increases, the colors of different test areas look more different in terms of saturation. This means that the test pattern is more desirable.

Similar to the sixth embodiment, not only the gradation value for the peak of the curve but also the magnitude of the "saturation difference–lightness difference" vary from one color to another. Thus, as shown in FIG. 12, two out of three curves are combined and summed up and three synthesized curves are compared to determine the color combination and the gradation value that exhibit the greatest value. This method, although it does not necessarily provide the maximum sensitivity for each of the three colors, allows both of the two parameter-changed colors to attach a relatively greater importance to the color difference based on saturation. Therefore, the test pattern with a good visual sensitivity balance can be obtained.

While this embodiment employs as an example a test pattern in which the PCBk area and the reference area are placed adjacent to each other, the test pattern need not be limited to this example but may use other forms of pattern. Further, the constructions for other test patterns and the detection of the patch are similar to the first embodiment and therefore their explanations are omitted here.

By considering a saturation and a lightness in generating the test pattern, as in this embodiment, the test pattern thus obtained enables a highly precise decision of identifying an achromatic color in particular.

Seventh Embodiment

This embodiment is made by combining the first, fourth and sixth embodiments described above. In a patch pattern in which the test area and the reference area are repeated alternately, as shown in FIG. 7, the spatial frequencies of the two areas are set almost equal and mainly the saturation is changed from one test area to another in each patch. This embodiment prevents a difference in the spatial frequency from disturbing the decision the user makes on the color uniformity of the patch and allows the user to better recognize the color difference between the patches.

While, in the above first to seventh embodiments, the descriptions concern the print heads of so-called bubble jet type in the ink jet system, the application of the present invention is not limited to this type of print heads. Although in the preceding embodiments the color deviation has been described to be caused by the output characteristics differing among the print heads, it should of course be noted that the color deviation showing up in the printed result involves a variety of factors in the printing apparatus in which the print heads are mounted. In this specification, the output characteristics associated with these factors and appearing in the printed result are also included in the above-mentioned output characteristics of the print heads.

The present invention can also be applied to the printing performed by a printing apparatus which is not equipped with print heads but uses toners as colorants.

Further, the preceding embodiments have described the test pattern print data as being generated by the host device and also the correction processing based on the information on the user-selected patch as being performed by the host device. Other configurations may also be adopted. For example, the above processing may be performed by the printer as the printing apparatus and at least the test pattern printing may be done by the printing apparatus separately.

Other Embodiments

The present invention may be applied to a system consisting of a plurality of devices (such as a host computer, an interface device, a reader and a printer) or to single device (such as a copying machine and a facsimile).

The present invention also includes a configuration in which a computer in an apparatus or system, which is connected with a variety of devices so as to realize functions of the foregoing examples shown in FIG. 6 is loaded with a program code of software and in which these devices are operated according to the program stored in the computer (CPU or MPU).

In this case, the software program code itself realizes the functions of these examples. The program code and a means for loading the program code to the computer, such as a storage medium containing a program code, constitute the present invention.

The storage media for storing the program code include floppy disk, hard disk, optical disk, magneto optical disk, CD-ROM, magnetic tape, nonvolatile memory card and ROM.

The program code is included in the present invention not only when the functions of the aforementioned examples are realized by executing the program code loaded into the computer, but also when these functions are realized by the program code in cooperation with an OS (operating system) or application software running on the computer.

It is needless to say that the present invention further includes a configuration in which the program code is stored in a memory mounted on a computer's function extension board or a function extension unit connected to the computer and the CPU in the function extension board or unit executes a part or all of the actual processing according to the instructions of the program code to realize the functions of the preceding examples.

As described above, according to the embodiments of the present invention, the patches each have a test area and a reference area arranged adjacent to each other and these two areas are repeated alternately. Hence, a degree at which the colors of the two areas when compared tend to be perceived as different is alleviated according to a number of repetitions of the two areas. Therefore, for example, when a correction amount at which an output characteristic variation is corrected based on the patch selection is set at not so large a value, the number of repetitions of the two areas of each of patches can be determined according to the correction amount. Among these patches, when selecting a patch that exhibits the most color uniformity with not so large perceivable color difference between the two areas, the selected patch is one corresponding to the color deviation equivalent to the correction amount.

As a result, in the processing of correcting the color deviation caused by output characteristic variations among print heads, the visual detection of the color deviation can be done properly and with high precision.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A test pattern printing method of printing a test pattern used in correction processing, the correction processing making an output characteristic for each of a plurality of colorants a predetermined output characteristic to correct color deviation, said method comprising the step of:

printing a plurality of patches, each of which has test areas and reference areas placed adjacent to one another, the test areas being printed with a mixture of the plurality of colorants and serving as an indicator for indicating a degree of the color deviation and the reference areas serving as references to be compared with the test areas for the color deviation, the plurality of patches being printed at different mixing ratios of the plurality of colorants, respectively, wherein the test areas and the reference areas are arranged in each of the plurality of patches so that the test areas and the reference areas are repeated alternately.

2. A test pattern printing method as claimed in claim 1, wherein the test areas and the reference areas are arranged in a checkered pattern in each of the plurality of patches.

3. A test pattern printing method as claimed in claim 1, wherein the test areas and the reference areas are repeated alternately in each of the plurality of patches in a manner that widths of the test and reference areas are changed in a plurality of steps.

4. A test pattern printing method as claimed in claim 1, wherein in each of the plurality of patches, the reference areas are printed with an achromatic colorant plus a plurality of colorants used to print the test areas adjacent to the reference areas.

5. A test pattern printing method as claimed in claim 1, wherein in each of the plurality of patches, a number of repetitions of the test areas and the reference areas is set to a value that causes a color difference, which is produced by changing the mixing ratio of the colorants from one patch to another, to preferentially depend on a lightness difference.

6. A test pattern printing method as claimed in claim 1, wherein in said step of printing the plurality of patches, the patches are printed so that spatial frequencies of dots formed in the test areas and the reference areas are close to each other.

7. A test pattern printing method as claimed in claim 6, wherein in said step of printing the plurality of patches, the patches are printed by determining the mixing ratios of the colorants in the plurality of patches so that a saturation of the printed patches is given priority in changing in response to the colorant mixing ratio changing from one patch to another.

8. A test pattern printing method as claimed in claim 1, wherein a unit change amount of color in changing in response to the colorant mixing ratio changing from the test area of one patch to another corresponds to a number of repetitions of the test areas and the reference areas.

9. An information processing apparatus for performing a processing of printing a test pattern used in correction processing, the correction processing making an output characteristic for each of a plurality of colorants a predetermined output characteristic to correct color deviation in printing by a printing apparatus, said apparatus comprising:

means for supplying patch data used for printing a plurality of patches to the printing apparatus; and means for causing the printing apparatus to print the plurality of patches, each of which has test areas and reference areas adjacent to one another, the test areas being printed with a mixture of the plurality of colorants and serving as an indicator for indicating a degree of the color deviation and the reference areas serving as a reference to be compared with the test areas for the color deviation, the plurality of patches being printed at different mixing ratios of the plurality of colorants, respectively, wherein the test areas and the reference areas are arranged in each of the plurality of patches so that the test areas and the reference areas are repeated alternately.

10. An information processing apparatus as claimed in claim 9, wherein the test areas and the reference areas are arranged in a checkered pattern in each of the plurality of patches.

11. An information processing apparatus as claimed in claim 9, wherein the test areas and the reference areas are repeated alternately in each of the plurality of patches in a manner that widths of the test and reference areas are changed in a plurality of steps.

12. An information processing apparatus as claimed in claim 9, wherein in each of the plurality of patches, the reference areas are printed with an achromatic colorant plus a plurality of colorants used to print the test areas adjacent to the reference areas.

13. An information processing apparatus as claimed in claim 9, wherein in each of the plurality of patches, a number of repetitions of the test areas and the reference areas is set to a value that causes a color difference, which is produced by changing the mixing ratio of the colorants from one patch to another, to preferentially depend on a lightness difference.

14. An information processing apparatus as claimed in claim 9, wherein said causing means causes the printing apparatus to print the patches so that spatial frequencies of dots formed in the test areas and the reference areas are close to each other.

15. An information processing apparatus as claimed in claim 14, wherein said causing means causes the printing apparatus to print the patches by determining the mixing ratios of the colorants in the plurality of patches so that a saturation of the printed patches is given priority in changing in response to the colorant mixing ratio changing from one patch to another.

16. An information processing apparatus as claimed in claim 9, wherein a unit change amount of color in changing in response to the colorant mixing ratio changing from the test areas of one patch to another corresponds to a number of repetitions of the test areas and the reference areas.

17. A printing apparatus capable of printing a test pattern used in correction processing, the correction processing making an output characteristic for each of a plurality of colorants a predetermined output characteristic to correct color deviation, said apparatus comprising:

printing means for printing a plurality of patches, each of which has test areas and reference areas adjacent to one another, the test areas being printed with a mixture of the plurality of colorants and serving as an indicator for indicating a degree of the color deviation and the reference areas serving as a reference to be compared with the test areas for the color deviation, the plurality of patches being printed at different mixing ratios of the plurality of colorants, respectively; and supplying means for supplying patch data used for printing the plurality of patches to said printing means, wherein the test areas and the reference areas are arranged in each of the plurality of patches so that the test areas and the reference areas are repeated alternately.

18. A printing apparatus as claimed in claim 17, wherein the test areas and the reference areas are arranged in a checkered pattern in each of the plurality of patches.

19. A printing apparatus as claimed in claim 17, wherein the test areas and the reference areas are repeated alternately in each of the plurality of patches in a manner that widths of the test and reference areas are changed in a plurality of steps.

20. A printing apparatus as claimed in claim 17, wherein in each of the plurality of patches, the reference areas are printed with an achromatic colorant plus a plurality of colorants used to print the test areas adjacent to the reference areas.

21. A printing apparatus as claimed in claim 17, wherein in each of the plurality of patches, a number of repetitions of the test areas and the reference areas is set to a value that causes a color difference, which is produced by changing the mixing ratio of the colorants from one patch to another, to preferentially depend on a lightness difference.

22. A printing apparatus as claimed in claim 17, wherein said printing means prints the patches so that spatial frequencies of dots formed in the test areas and the reference areas are close to each other.

23. A printing apparatus as claimed in claim 22, wherein said printing means prints the patches by determining the mixing ratios of the colorants in the plurality of patches so that a saturation of the printed patches is given priority in changing in response to the colorant mixing ratio changing from one patch to another.

24. A printing apparatus as claimed in claim 17, wherein a unit change amount of color in changing in response to the colorant mixing ratio changing from the test areas of one patch to another corresponds to a number of repetitions of the test areas and the reference areas.

25. A printing apparatus as claimed in claim 17, wherein a plurality of print heads, corresponding in number to the number of the plurality of colorants, is used to perform printing.

26. A printing apparatus as claimed in claim 25, wherein the print heads eject ink to form dots.

27. A printing apparatus as claimed in claim 26, wherein the print heads use thermal energy to generate bubbles in the ink and eject the ink by pressure of the bubbles.

28. A storage medium storing a program readable by an information processing apparatus, a processing of the program being a test pattern printing processing for printing a test pattern used in correction processing, the correction processing making an output characteristic for each of a plurality of colorants a predetermined output characteristic to correct color deviation, said processing comprising the step of:

printing a plurality of patches, each of which has test areas and reference areas adjacent to one another, the test areas being printed with a mixture of the plurality of colorants and serving as an indicator for indicating a degree of the color deviation and the reference areas serving as a reference to be compared with the test areas for the color deviation, the plurality of patches being printed at different mixing ratios of the plurality of colorants, respectively, wherein the test areas and the reference areas are arranged in each of the plurality of patches so that the test areas and the reference areas are repeated alternately.

* * * * *

UNITED STATES PATENT AND TRADEMARK OFFICE
CERTIFICATE OF CORRECTION

PATENT NO. : 6,494,557 B1
DATED : December 17, 2002
INVENTOR(S) : Kato et al.

It is certified that error appears in the above-identified patent and that said Letters Patent is hereby corrected as shown below:

Column 1,
Line 45, "having" should read -- have --.

Column 2,
Line 10, "as" should be deleted.

Column 6,
Line 41, "a" should read -- an --; and
Line 60, "the both" should read -- both --.

Column 7,
Line 44, "The both" should read -- Both --.

Column 8,
Line 54, "for" should read -- for the --.

Column 9,
Line 5, "secondstage" should read -- second-stage --.

Column 17,
Line 33, "(curve" should read -- (curves --.

Column 19,
Line 4, "recognizing" should read -- recognize --.

Column 20,
Line 41, "(curve" should read -- (curves --.

Signed and Sealed this

Twenty-eighth Day of October, 2003

JAMES E. ROGAN
*Director of the United States Patent and Trademark Office*